United States Patent
Yoshida

(10) Patent No.: US 8,217,972 B2
(45) Date of Patent: Jul. 10, 2012

(54) PRINTER

(75) Inventor: Naoki Yoshida, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/121,945

(22) PCT Filed: Oct. 4, 2010

(86) PCT No.: PCT/JP2010/067347
§ 371 (c)(1),
(2), (4) Date: Mar. 30, 2011

(87) PCT Pub. No.: WO2011/092896
PCT Pub. Date: Aug. 4, 2011

(65) Prior Publication Data
US 2011/0285974 A1   Nov. 24, 2011

(30) Foreign Application Priority Data
Jan. 28, 2010   (JP) ................................ 2010-017106

(51) Int. Cl.
*B41J 2/32* (2006.01)
(52) U.S. Cl. .................. 347/198; 347/171; 347/218
(58) Field of Classification Search ............... 347/198, 347/187, 218, 171, 2, 5, 229, 234, 235, 241, 347/244, 248, 256, 258; 359/454, 455, 463
See application file for complete search history.

(56) References Cited

U.S. PATENT DOCUMENTS

| | | | |
|---|---|---|---|
| 5,764,266 A * | 6/1998 | Azuma et al. | 347/171 |
| 5,812,152 A | 9/1998 | Torigoe et al. | |
| 7,543,910 B2 | 6/2009 | Suzuki | |
| 2009/0079770 A1 * | 3/2009 | Suzuki | 347/2 |
| 2010/0295915 A1 * | 11/2010 | Karszes et al. | 347/171 |
| 2011/0074906 A1 * | 3/2011 | Imai | 347/218 |

FOREIGN PATENT DOCUMENTS

| | | |
|---|---|---|
| JP | 7-261120 | 10/1995 |
| JP | 10-181954 | 7/1998 |
| JP | 11-322135 | 11/1999 |
| JP | 2000-292871 | 10/2000 |
| JP | 2007-76084 | 3/2007 |

OTHER PUBLICATIONS

Written Opinion of the International Searching Authority (ISA) (PCT Form PCT/ISA/237) dated Nov. 16, 2010, with English translation.

* cited by examiner

*Primary Examiner* — Kristal Feggins
(74) *Attorney, Agent, or Firm* — McGinn IP Law Group, PLLC

(57) ABSTRACT

Tilt angle and tilt direction of lenticular lenses are detected precisely to correct attitude of a transported lenticular sheet with high accuracy. At least first to third lens sensors are disposed in a transport track of the lenticular sheet, aligned in a main scan direction and spaced at uneven intervals. Each lens sensor has a light-emitting element and a light-receiving element arranged to sandwich the lenticular sheet and output a detection signal corresponding to concavities and convexities of the lenticular lenses. During the transport of the lenticular sheet, the detection signals output from the first to third lens sensors are analyzed to detect the tilt direction and the tilt angle of the lenticular lenses accurately. Based on the tilt direction and the tilt angle, the attitude of the lenticular sheet is corrected in advance, preventing the lenticular sheet from skewing while stripe images are being recorded thereon.

9 Claims, 19 Drawing Sheets

FIG.8
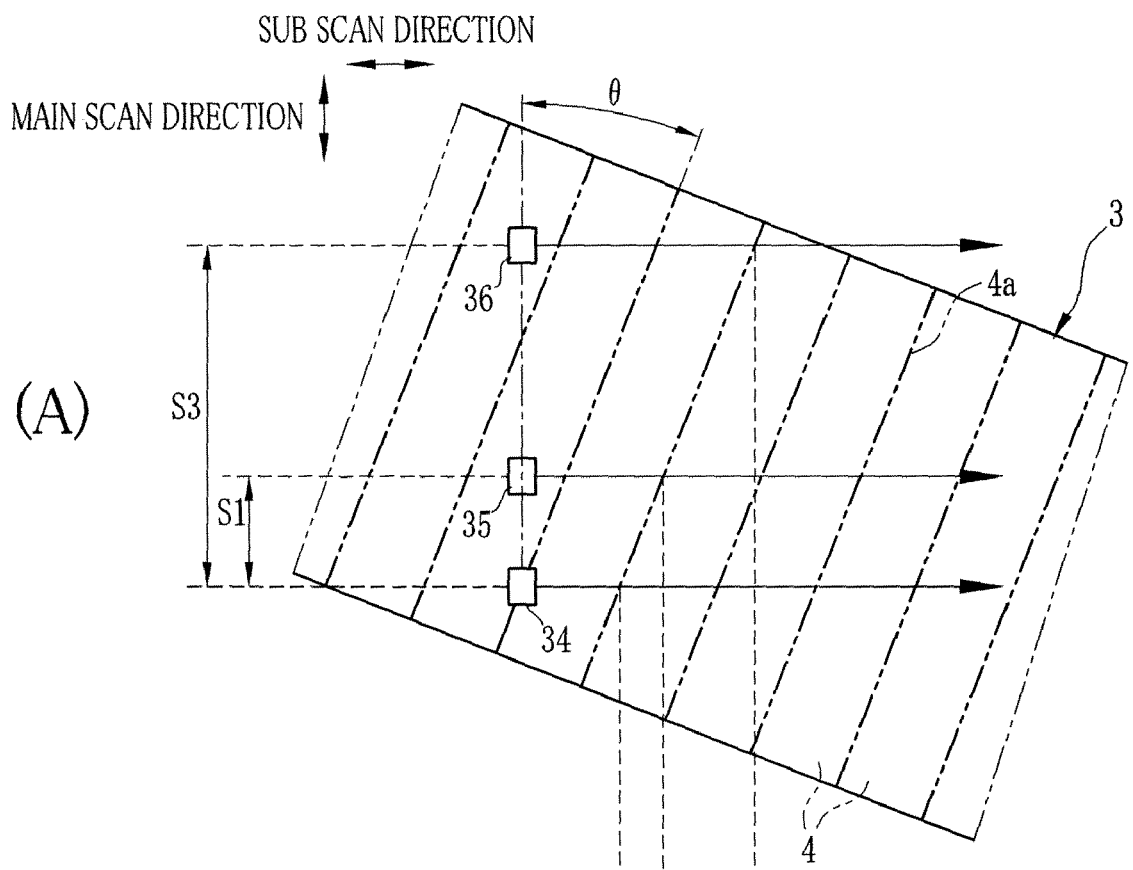
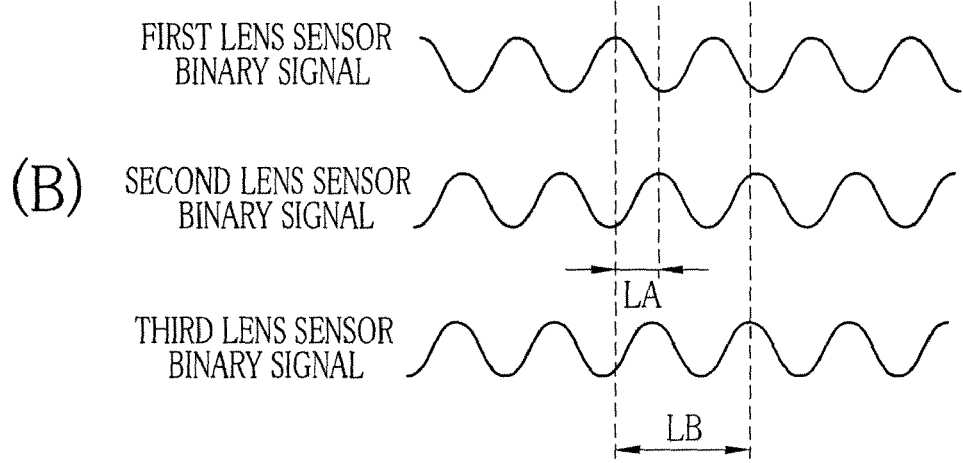

FIG. 9
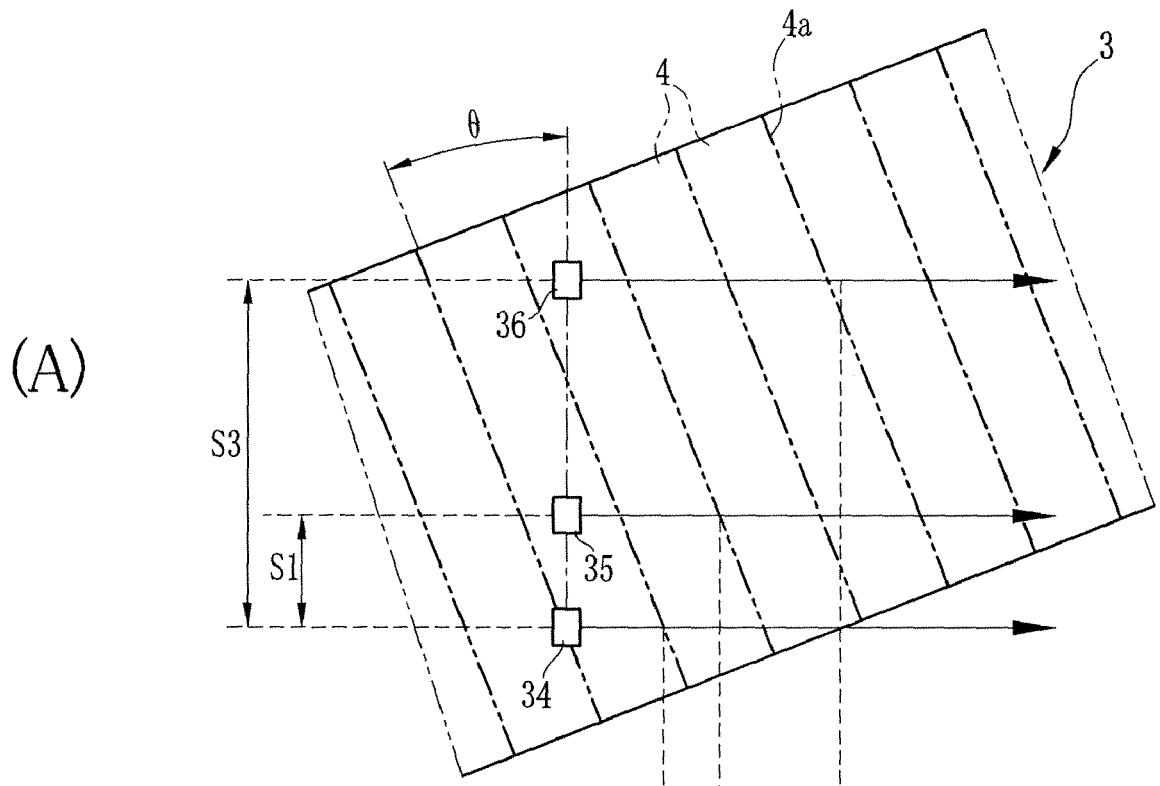
(A)
(B) FIRST LENS SENSOR BINARY SIGNAL
SECOND LENS SENSOR BINARY SIGNAL
THIRD LENS SENSOR BINARY SIGNAL
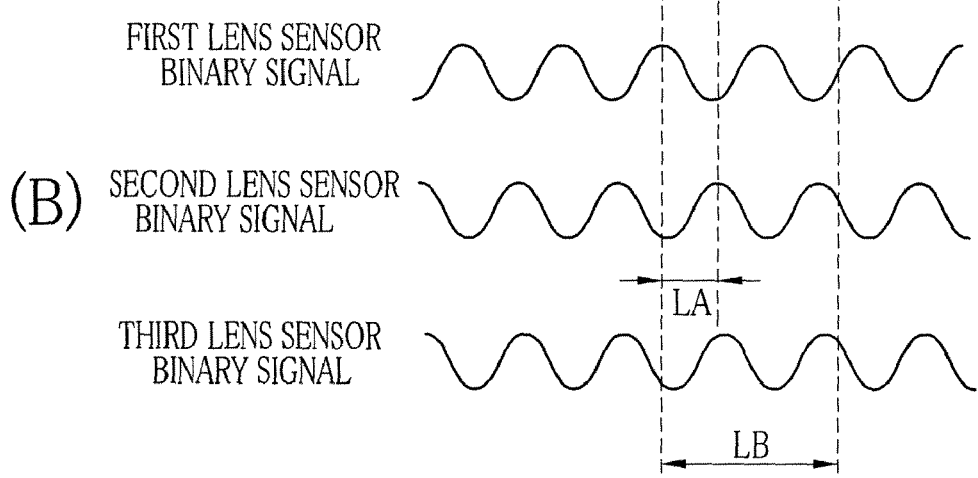

PRINTER

FIELD OF THE INVENTION

The present invention relates to a printer for providing a print that looks three-dimensional to the naked eyes, and more particularly to a printer that can correct the attitude of a lenticular sheet so as to prevent it from skewing.

BACKGROUND OF THE INVENTION

A technique for creating a stereoscopically viewed image using a lenticular sheet, which has a large number of lenticular lenses arrayed in parallel to each other, has been known. This is done for example by subdividing R and L viewpoint images, which have been taken from right and left points of view, into lines, and arranging the subdivided lines (stripe images) of the R viewpoint image alternately with the stripe images of the L viewpoint image on the back of the lenticular sheet such that adjoining two stripe images are positioned underneath one lenticular lens. The R and L viewpoint images having a parallax to each other are seen as a stereoscopic image when they are observed through the lenticular lenses by the left and right eyes respectively. It is also known capturing N viewpoint images (N=3 or more), subdividing these images into stripe images, and disposing N lines of these stripe images behind one lenticular lens in order to enhance the stereoscopic effect.

Such stripe images may be printed by a printer on the reverse surface of the lenticular sheet while transporting the lenticular sheet intermittently in a sub scan direction. Immediately after each intermittent transport, a recording head is driven to record the stripe image extending in a main scan direction sequentially onto the lenticular sheet. Thus, at least two kinds of viewpoint images with a parallax to each other are recorded on the reverse surface of the lenticular sheet (see JPA 2000-292871 and JPA 2007-144974).

It sometimes happens that a lenticular sheet is conveyed aslant while multiple viewpoint images are being recorded on the reverse surface of the lenticular sheet. This is referred to as "skew". In that case, since the longitudinal direction of the lenticular lenses is misaligned with the main scan direction during the image recording, the recording quality will be remarkably degraded. A variety of solutions for preventing the recording quality from being degraded by the skewed lenticular sheet have conventionally been developed.

JPA 2007-076084 discloses a printer that has a photo sensor nearby its recording head so as to detect the position of the lenticular lenses through the photo sensor and adjust the image recording position on the lenticular sheet based on the result of the detected position. Thus, even while the lenticular sheet is on the skew, the image recording position may be adjusted in accordance with this skew.

JPA 1996-137034 discloses a printer that corrects the attitude of the lenticular sheet in advance so as to avoid the skew during the recording. This printer detects a tilt angle of the lenticular lenses relative to the main scan direction and turns the lenticular sheet about an axis perpendicular to a transport plane according to the detection result. For the sake of detecting the tilt angle, a couple of photo sensors aligned in the scanning direction are disposed on a sheet transport track. Each photo sensor outputs a detection signal corresponding to concavities and convexities of the lenticular lenses. The tilt angle of the lenticular lenses may be detected from these detection signals.

However, in a case where the recording position of the viewpoint images is adjusted on the side of the recording head, like in JPA 2007-076084, if the lenticular sheet skews to a large extent, the viewpoint images recorded on the lenticular sheet will be so distorted that the recording quality will be degraded.

On the other hand, where the lenticular sheet is turned to correct its attitude, like in the printer of JPA 1996-137034, the viewpoint images will not have such a distortion. However, it is difficult to determine which one of detection signals output from the two photo sensors (see for example FIGS. 8 to 11) is ahead of or behind the other in phase. Therefore, the printer of JPA 1996-137034 cannot always detect the tilt angle or tilt direction of the lenticular lenses precisely enough to perform the attitude correction with accuracy.

Where a couple of photo sensors are aligned with each other in the main scan direction, like in the printer of JPA 1996-137034, it may be possible to calculate the tilt direction and tilt angle of the lenticular lenses from a time lag between respective times of detection of a leading end of the lenticular sheet by the two photo sensors. However, if the leading end of the lenticular sheet is not parallel to the longitudinal direction of the lenticular lenses, because of manufacture errors or other various factors, it is impossible to detect the exact tilt angle of the lenticular lenses. As a result, it becomes impossible to align the longitudinal direction of the lenticular lenses with the main scan direction.

The present invention has an object to provide a printer that can detect the tilt angle and tilt direction of the lenticular lenses with precision and correct the attitude of the lenticular sheet with high accuracy.

SUMMARY OF THE INVENTION

To achieve the above object, a printer of the present invention comprises a transport section, a recording section, at least first to third detecting sensor, an attitude adjusting section, and a control section, and records multiple viewpoint images on a lenticular sheet after correcting the attitude of the lenticular sheet for preventing the skew thereof. The lenticular sheet has a plurality of lenticular lenses formed on an obverse surface, the lenses extending in a main scan direction. The transport section transports the lenticular sheet along a transport track extending in a sub scan direction perpendicular to the main scan direction. The recording section subdivides the multiple viewpoint images into stripe images in parallel to the main scan direction, and records them on a reverse surface of the lenticular sheet. The first to third detecting sensors are disposed in the transport track and aligned in the main scan direction, to output detection signals corresponding to concavities and convexities of the lenticular lenses. These first to third detecting sensors are so arranged that at least one of three distances existing between them is different from other two distances. The attitude adjusting section adjusts the attitude of the lenticular sheet on the transport track. The control section determines, prior to the recording by the recording section, the tilt direction and angle of the longitudinal direction of the lenticular lenses relative to the main scan direction on the basis of the detection signals of the respective detecting sensors. Next, the control section controls the attitude adjusting section on the basis of the determined tilt direction and angle, so as to align the longitudinal direction of the lenticular lenses to be substantially parallel to the main scan direction.

The tilt direction is preferably determined from the detection signals of the first to third detecting sensors, whereas the tilt angle is preferably determined from the detection signals of two of the detecting sensors.

The attitude adjusting section preferably carries out attitude correction of the lenticular sheet (tilt correction of the lenticular lenses) in two steps including rough adjustment and fine adjustment. The attitude of the lenticular sheet is roughly adjusted form a first tilt direction and a first tilt angle, which are determined first. After this rough adjustment, the control section determines a second tilt direction and a second tilt angle. On the basis of these second tilt direction and second tilt angle, the attitude of the lenticular sheet is finely adjusted. In that case, the first tilt angle is determined from the detection signals of those two of the detecting sensors which are spaced at a narrower distance, and the second tilt angle is determined from the detection signals of those two of the detecting sensors which are spaced at a wider distance.

It is preferable to provide a regulation guide for regulating the attitude of the lenticular sheet on the transport track. A transport length of the lenticular sheet is measured in a period from when either one of the two detecting sensors used for the rough adjustment detects any of the lenticular lenses till when the other detects this lenticular lens. The regulation guide regulates the attitude of the lenticular sheet on the transport track so as to make this transport length smaller than a lens pitch of the lenticular lenses.

The distance between the two detecting sensors used for the rough adjustment is so determined that a transport length of the lenticular sheet in a period from when either one of these two detecting sensors detects any of the lenticular lenses till when the other detects this lenticular lens may be smaller than a lens pitch of the lenticular lenses.

Preferably, the distance between the first detecting sensor and the second detecting sensor and the distance between the second detecting sensor and the third detecting sensor are in the relation of prime numbers that they have no common divisor except "1".

It is preferable to provide the transport track with a regulation guide for regulating skew angle of the lenticular sheet to be within a predetermined angle. It is provided that "n" represents a maximum number of those lenticular lenses which a straight line connecting the detecting sensors may concurrently cut across over the lenticular sheet when the lenticular sheet skews maximally, and S1 represents a magnitude of the distance between the first detecting sensor and the second detecting sensor. It is also provided that S2 represents a magnitude of the distance between the second detecting sensor and the third detecting sensor, and "M" represents any natural number from "2" to "n". Then the S1 and S2 satisfy the following formulas:

$$S1 \neq \{(S1+S2)/M\}$$

$$S2 \neq \{(S1+S2)/M\}$$

The above printer comprises a recording controller that drives the recording section to record a test image elongated in the main scan direction on the lenticular sheet, a transport controller that controls the transport section such that the lenticular sheet after having the test image recorded thereon will pass through the first to third detecting sensors, and a shift amount detector that detects shift amounts of relative positions of the detecting sensors in the sub scan direction by comparing the detection signals of the detecting sensors after the test image is recorded till the test image moves past the detecting sensors. On the basis of a result of detection by the shift amount detector, the control section determines the tilt angle and the tilt direction from the detection signals of the detecting sensors, assuming that the relative positions of the detecting sensors are in alignment with each other.

The control section decides the lens pitch of the lenticular lenses on the basis of a transport length of the lenticular sheet in a cycle of the detection signals and the previously determined tilt angle. The attitude adjusting section comprises a clamper for clamping a leading end of the lenticular sheet and a turning mechanism for turning the clamper above a transport surface of the transport track.

The first to third detecting sensors consist of light-emitting elements for projecting light toward the lenticular sheet and light-receiving elements for receiving light projected from the light-emitting element.

In the printer of the present invention, three or more detecting sensors are aligned in the main scan direction such that at least a distance differs from any other distances among the distances between the sensors, whereby the tilt direction and the tilt angle of the lenticular lenses can be determined with accuracy on the basis of the detection signals from the respective detecting sensors. Thus the attitude of the lenticular sheet can be corrected to align the longitudinal direction of the lenticular lenses to be parallel to the main scan direction.

Since the tilt correction is executed in two steps: the rough adjustment being carried out on the basis of a tilt angle determined by the detection signals of two adjacent detecting sensors, and the fine adjustment being carried out on the basis of a tilt angle determined by the detection signals of two detecting sensors which are spaced at a greater distance than a distance between the two detecting sensors used for the rough adjustment, the tilt angles can be easy to calculate. As a result, the attitude correction may be accomplished in a short time.

In the case where the shift amounts of the relative positions of the detecting sensors in the sub scan direction are detected to determine the tilt angle and the tilt direction based on this detection result on the assumption that the relative positions of the detecting sensors are in alignment with each other, the accuracy in positioning the detecting sensors can be rough. As a result, the cost of manufacturing the printer may be reduced.

BRIEF DESCRIPTION OF THE DRAWINGS

FIG. 8 is an explanatory diagram illustrating a tilt direction detecting process in a case where lenticular lenses tilt clockwise;

FIG. 9 is an explanatory diagram illustrating a tilt direction detecting process in a case where lenticular lenses tilt counterclockwise;

DETAILED DESCRIPTION OF THE PREFERRED EMBODIMENTS

Figure 1:
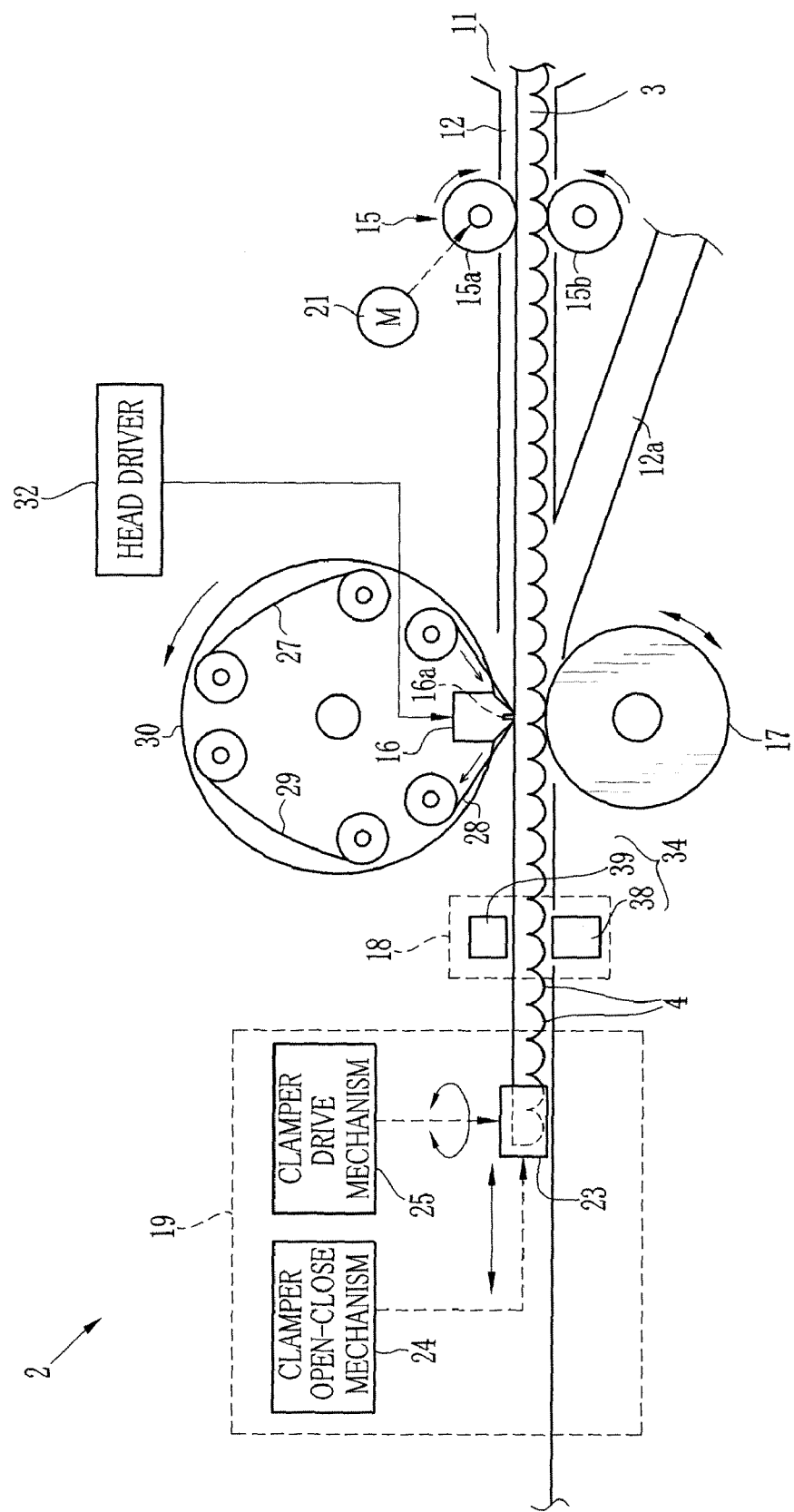
FIG. 1 is a schematic diagram illustrating an example of a printer in accordance with the present invention.

As shown in FIG. 1, a printer 2 records parallax images (multiple viewpoint images) in a sublimation method onto the reverse surface of a lenticular sheet 3, hereinafter referred to simply as the sheet 3, to make a stereoscopic image visible. The printer 2 converts two viewpoint images to six viewpoint images and records these six viewpoint images on the lenticular sheet 3.

Figure 2:
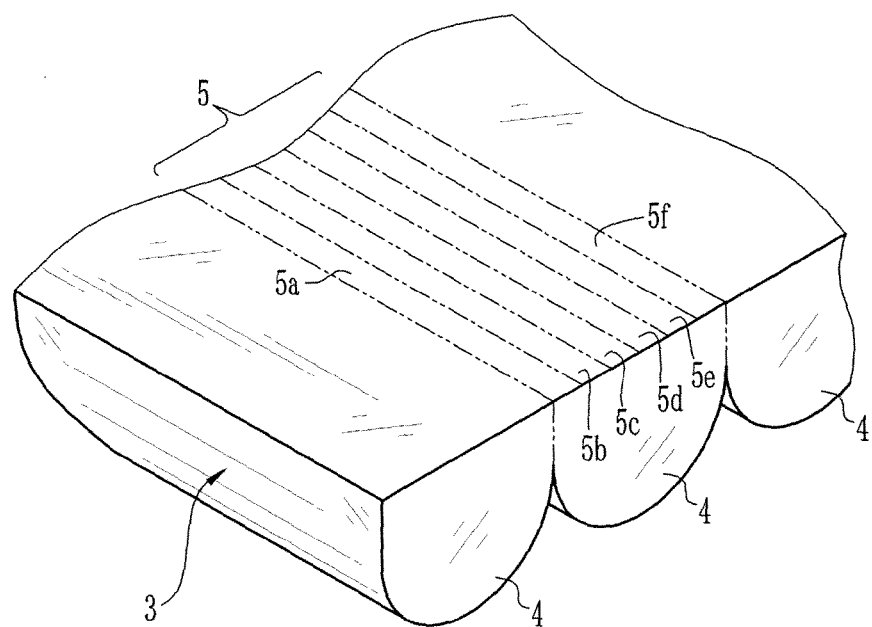
FIG. 2 is a perspective view of a lenticular sheet.

As shown in FIG. 2, the lenticular sheet 3 has an array of large numbers of semi-cylindrical lenticular lenses 4 (hereinafter referred to simply as the lenses 4) in a well-known manner on the obverse side, the reverse surface being flat. The lenses 4 extend in the main scan direction. The reverse surface of the lenticular sheet 3 is virtually divided into image segments 5 corresponding to the individual lenses 4, one segment 5 being allocated to one lens 4. Each image segment 5 is subdivided in the arrayed direction of the lenses 4 into a number of micro segments corresponding to the number of viewpoint images; first to sixth micro segments 5a to 5f in this embodiment. Stripe images provided by subdividing the six viewpoint images into lines are respectively recorded on the six micro segments 5a to 5f, which are allocated to the first to sixth viewpoint images in one to one relationship.

In the present embodiment, the micro segments 5a to 5f are each 42 μm in width (length in the sub scan direction), each stripe image having a width of 20 μm. For instance, two adjacent lines (two stripe images) of the first viewpoint image are recoded in parallel on the first micro segment 5a.

Referring back to FIG. 1, the printer 2 is provided with a transport track 12 for transporting the lenticular sheet 3 as it is fed in through a feed-in slot 11. In the transport track 12, the lenticular sheet 3 is set with the lenses 4 downward and transported in the arrayed direction of the lenses 4 (the sub scan direction). The lenticular sheet 3 may be fed automatically from a cassette containing a pile of these lenticular sheets 3 by means of a feeding mechanism, or may be manually inserted into the feed-in slot 11. It is to be noted that the lenses 4 are over-scaled as compared to their actual size in FIG. 1.

On a downstream side of the feed-in slot 11 in the sheet transport direction, a pair of feed rollers 15, a set of a thermal head 16 and a platen roller 17, an azimuth angle detector 18, and a clamp unit (corresponding to a transport section and an attitude adjusting section) 19 are sequentially disposed. The feed roller pair 15 consists of a capstan roller 15a driven to rotate by a motor 21 and a pinch roller 15b to be pressed against the capstan roller 15a to nip the lenticular sheet 3, and feeds the lenticular sheet 3 toward the clamp unit 19. The pinch roller 15b is movable between a nipping position to nip the lenticular sheet 3 between the rollers 15a and 15b, and a release position off the lenticular sheet 3.

The clamp unit 19 consists of a clamper 23, a clamper open-close mechanism 24, and a clamper drive mechanism 25. The clamper open-close mechanism 24 switches the clamper 23 between a closed state for clamping a leading end of the lenticular sheet 3 and an open state for unclamping.

The clamper drive mechanism 25 drives the clamper 23 to move back and forth horizontally along the transport track 12. Thus the lenticular sheet 3, clamped by the clamper 23, moves in the sub scan direction perpendicular to the main scan direction. The clamper 23 is moved between a clamp position for clamping or unclamping the lenticular sheet 3 and a terminal position downstream of the clamp position. The clamper drive mechanism 25 may drive the clamper 23 to turn about an axis that is vertical to the transport surface of the transport track 12. Thus, the lenticular sheet 3 may turn by an appropriate angle to adjust its attitude.

The transport track 12 is provided with a backward transport track 12a on an upstream side of the platen roller 17, the backward transport track descending toward the upstream side. The backward transport track 12a has a distal end provided with a feed-out slot (not shown) for feeding out the lenticular sheet 3 after the recording. The backward transport track 12a accepts the lenticular sheet 3 as it is conveyed back to the upstream side. The backward transport track 12a also guides the lenticular sheet 3 to the feed-out slot.

The thermal head 16 and the platen roller 17 are opposed to each other across the transport track 12. The thermal head 16 has two rows of heating element array 16a on its lower portion, the array having a large number of heating elements aligned in the main scan direction. Arranging the heating element array 16a in two adjoining rows permits recording at once two adjacent stripe images (two lines) of an identical viewpoint image. The lenticular sheet 3 is advanced in the sub scan direction by the width (42 μm) of the micro segment each after two lines are recorded thereon, thereby to record two stripe images adjoining in the sub scan direction on the reverse surface of the lenticular sheet 3. Each heating element array 16a has a length in the main scan direction, which is slightly greater than a width (or length in the main scan direction) of a recording area on the lenticular sheet 3.

The thermal head 16 is also movable from a pressing position for pressing recording film onto the reverse surface of the lenticular sheet 3 while the lenticular sheet 3 is on the platen roller 17 and the recording film is put on the reverse surface of the lenticular sheet 3, to an upper retracted position away from the pressing position. The recording film includes image reception layer film 27, ink film 28, and backing layer film 29. Each film 27 to 29 has a width that is substantially equal to the length of the heating element array 16a in the main scan direction, and has such a length that permits recording on a plurality of sheets.

These films 27 to 29 are mounted to a film changing mechanism 30 that is installed in a way to surround the thermal head 16. The film changing mechanism 30 has a shape of a substantially round barrel, and a pair of spools having each film 27 to 29 wound thereon are mounted on the circumferential area of the film changing mechanism 30. The film changing mechanism 30 may rotate to bring either one of the films 27 to 29 into underneath the thermal head 16 while the thermal head 16 is in the retracted position. During the recording, the film set on the thermal head 16 is fed from one spool to the other spool and wound up onto the other spool in synchronism with the transport of the lenticular sheet 3.

The image reception layer film 27 is for forming an image reception layer (base layer) on the reverse surface of the lenticular sheet 3, so that color inks from the ink film 28 may be attached to the image reception layer. When the image reception layer film 27 is heated by the thermal head 16 while the image reception layer film 27 is put on the reverse surface of the lenticular sheet 3, the image reception layer film 27 transfers the transparent image reception layer to the reverse surface of the lenticular sheet 3, forming the image reception layer on the reverse surface.

The ink film 28 may be a well-known sublimate-type ink film, which has yellow ink areas, magenta ink areas and cyan ink areas formed sequentially in the longitudinal direction of the film. Each ink area has approximately the same size as the reverse surface of the lenticular sheet 3. When the thermal head 16 heats the ink film 28 on the image reception layer that has been formed on the reverse surface of the lenticular sheet 3, the yellow ink, magenta ink or cyan ink is sublimated to transfer to the image reception layer. Because the amount of attached ink varies depending on the amount of heat generated from the thermal head 16, half-tone gradations may be reproduced.

When the backing layer film 29 is heated by the thermal head 16 while the backing layer film 29 is overlaid on an image that has been recorded on the lenticular sheet 3, the backing layer film 29 transfers a white backing layer to form the backing layer on the image. The backing layer reflects light to visualize a bright and clear color stereoscopic image.

The head driver 32 drives the individual heating elements of the thermal head 16. The head driver 32 drives the thermal head 16 such that every heating element generates the same amount of heat energy for recording the image reception layer or the backing layer. The amount of heat energy is set to be a value necessary for transferring the image reception layer or the backing layer. On the other hand, when recording an image using the ink film 28, the head driver 32 records a full-color image in the three-color frame sequential method, wherein the heating elements are heated on the basis of respective image data of the six viewpoint images so as to change the ink densities according to the image data.

The azimuth angle detector 18 optically detects the tilt direction of the lenses formed on the lenticular sheet 3 (the direction of azimuth) and the azimuth angle θ of the lenses 4, hereinafter referred to simply as the azimuth angle θ. The tilt direction indicates the direction in which the longitudinal direction of the lenses 4 inclines relative to the main scan direction. The azimuth angle θ indicates the magnitude of the tilt angle of the longitudinal direction of the lenses 4 relative to the main scan direction (see FIGS. 8 and 9).

Figure 3:
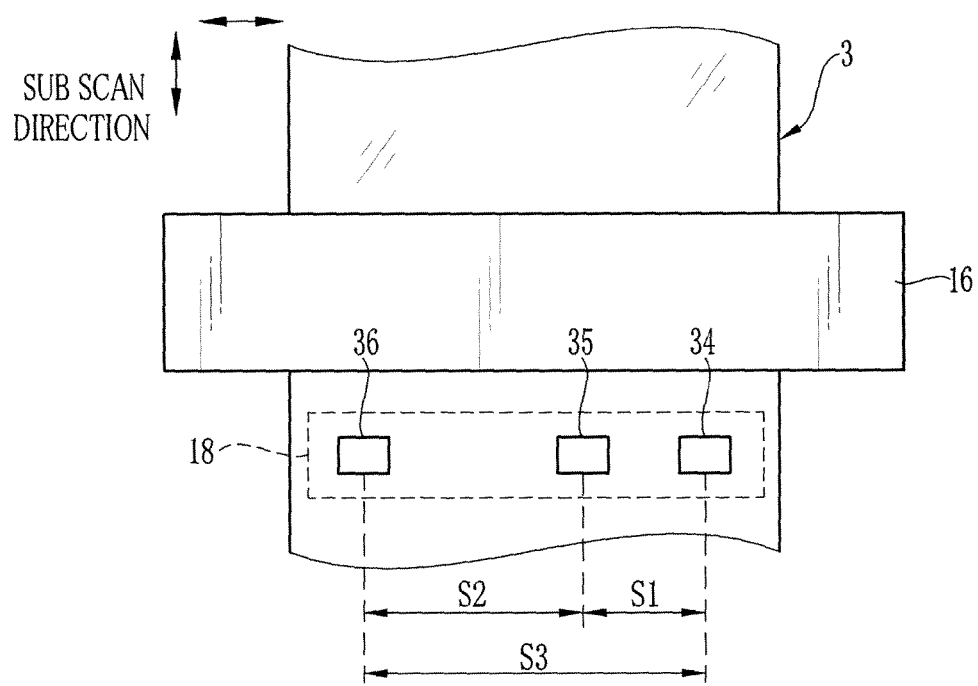
FIG. 3 is a top side view of an azimuth angle detector.

As shown in FIG. 3, the azimuth angle detector 18 has first to third lens sensors 34, 35 and 36 which are aligned in the main scan direction. The first lens sensor 34 is positioned to face one side edge of the lenticular sheet 3. The third lens sensor 36 is positioned to face the other side edge of the lenticular sheet 3.

The second lens sensor 35 is positioned between the first and third lens sensors 34 and 36 but on the side closer to the first lens sensor 34. Accordingly, the distance S2 between the second lens sensor 35 and the third lens sensor 36 is greater than the distance S1 between the first lens sensor 34 and the second lens sensor 35. Reference numeral S3 designates the distance between the first lens sensor 34 and the third lens sensor 36.

Figure 4A:
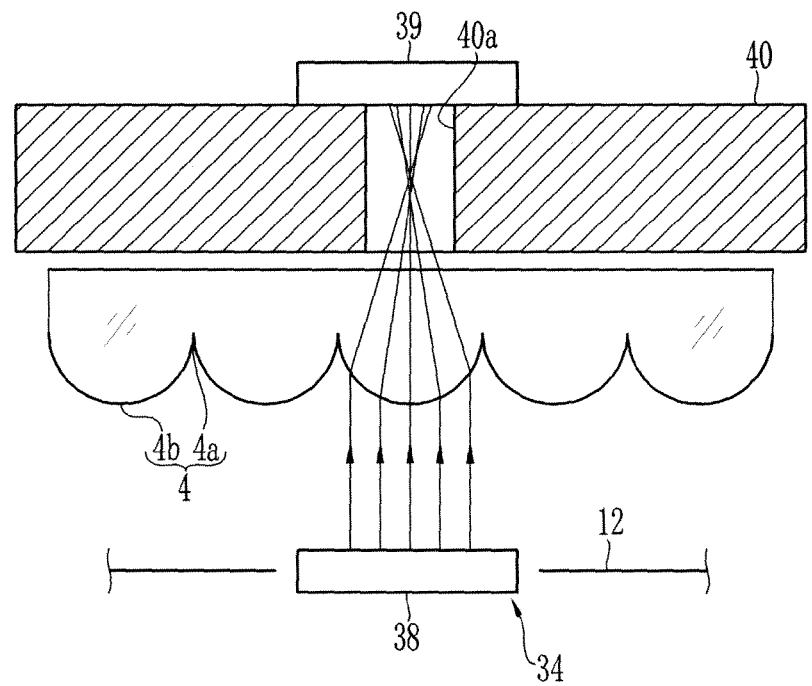
FIG. 4A is a side view of the azimuth angle detector.

As shown in FIG. 4A, the lens sensors 34 to 36 each consists of a light-emitting diode (LED) 38 located below the lenticular sheet 3, and a photo sensor 39 located vertically above this LED 38 and the lenticular sheet 3. The light-emitting diode 38 emits detection light toward the lenticular sheet 3. The photo sensor 39 receives the detection light as transmitting through the lenticular sheet 3, and outputs a detection signal according to the intensity of the detection light.

In addition, a slit board 40 is disposed between the photo sensor 39 and the lenticular sheet 3. The slit board 40 is formed with a slit 40a that limits the field of the detection light from the light-emitting diode 38. The slit board 40a is designed to have such a width that a light beam corresponding substantially to an individual lens 4 can pass through it. This will make the change in light amount steeper when the individual lens 4 passes through the lens sensors 34 to 36. Besides that, it will make sure of projecting a sufficient amount of detection light onto the photo sensor 39.

Figure 4B:
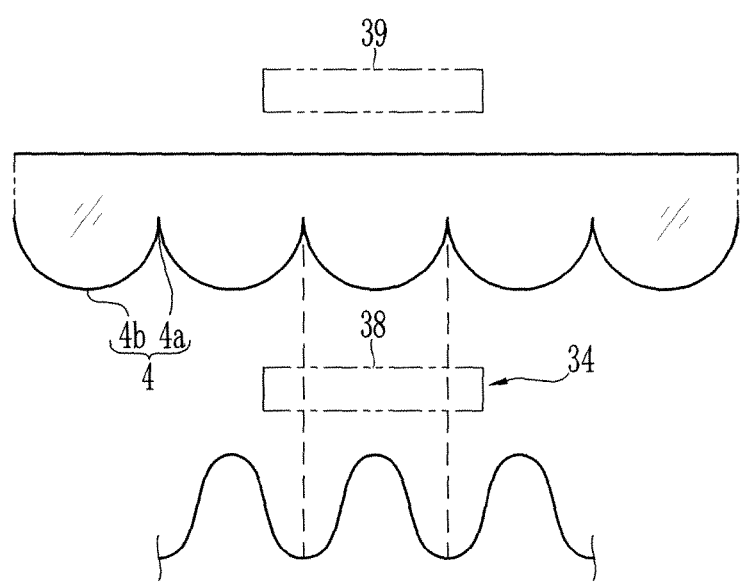
FIG. 4B is an explanatory diagram illustrating detection signals output from respective lens sensors.

As shown in FIG. 4B, the intensity of the detection light received on the photo sensor 39 varies depending upon the positional relationship between the lens sensors 34 to 36 and the lenses 4. So varies the detection signal accordingly. For example, the detection signals gradually go up after the lens sensors 34 to 36 face a border 4a between the lenses 4 until the lens sensors 34 to 36 face a peak 4b of the lens 4. The detection signals get to a peak value when the respective lens sensors 34 to 36 face the peak 4b, and thereafter go down gradually until the lens sensors 34 to 36 face another border 4a, and then the detection signals begin to go up gradually again.

Figure 5:
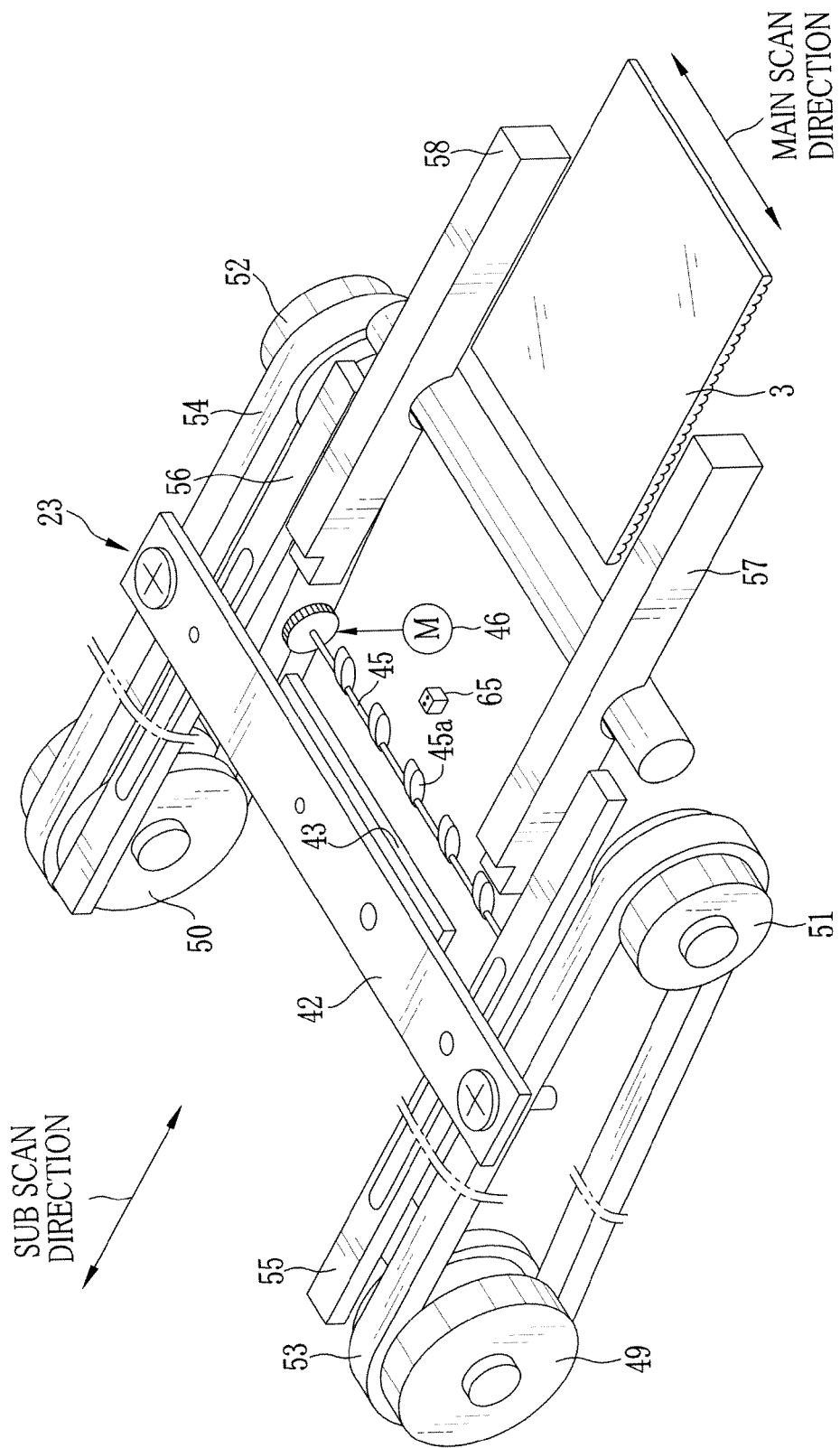
FIG. 5 is a perspective view of a clamp unit.

As shown in FIG. 5, the clamper 23 is provided with a fixed plate 42 and a movable plate 43. The fixed plate 42 is a flat plate having a length that is about twice the width of the lenticular sheet 3 in the main scan direction, and is positioned parallel to the transport surface. The movable plate 43 can swing between a clamping position for clamping the lenticular sheet 3 between the fixed plate 42 and the movable plate 43, and an unclamping position for unclamping the lenticular sheet 3. A spring (not shown) is disposed between the fixed plate 42 and the movable plate 43 to urge the movable plate 43 toward the clamping position.

The clamper open-close mechanism 24 consists of a cam-shaft 45 for swinging the movable plate 43, an unclamping motor 46 for rotating the cam shaft 45. The cam shaft 45 is disposed near the clamper 23 in the clamping position. The cam shaft 45 can rotate between a position where cams 45a push up the movable plate 43 against the urging force of the spring to set the movable plate 43 to the unclamping position, and a position for releasing the push-up of the movable plate 43 to let the movable plate 43 move back to the clamping position according to the urging force of the spring. Thus the cam shaft 45 is driven by the unclamping motor 46 to rotate to move the movable plate 43 between the unclamping position and the clamping position, switching the clamper 23 to the open state or the closed state.

The clamper drive mechanism 25 includes a left motor 49, a right motor 50, a left pulley 51, and a right pulley 52. The pulleys 51 and 52 are attached to a rotary shaft that is mounted rotatable. A left belt 53 is suspended between the left motor 49 and the left pulley 51, whereas a right belt 54 is suspended between the right motor 50 and the right pulley 52.

To the left and right belts 53 and 54 are attached opposite ends of the clamper 23 so as to be freely rotatable about respective axes that are vertical to the transport surface. Thus, as the left motor 49 and the right motor 50 run in the same rotational direction, the clamper 23 is moved in the sub scan direction by means of the left and right belts 53 and 54. On the other hand, when the left motor 49 and the right motor 50 run in the opposite directions, or when only one of them runs, the clamper 23 will turn above the transport surface.

The clamper drive mechanism 25 also includes a left guide rail 55 and a right guide rail 56 for guiding the clamper 23 in the sub scan direction. Inward of the guide rails 55 and 56 are disposed a left skew regulation guide 57 and a right skew regulation guide 58. The left and right skew regulation guides 57 and 58 restrict the skew angle of the lenticular sheet 3 within a predetermined angle while the lenticular sheet 3 is being transported from the feed roller pair 15 to the clamp unit 19.

Figure 6:
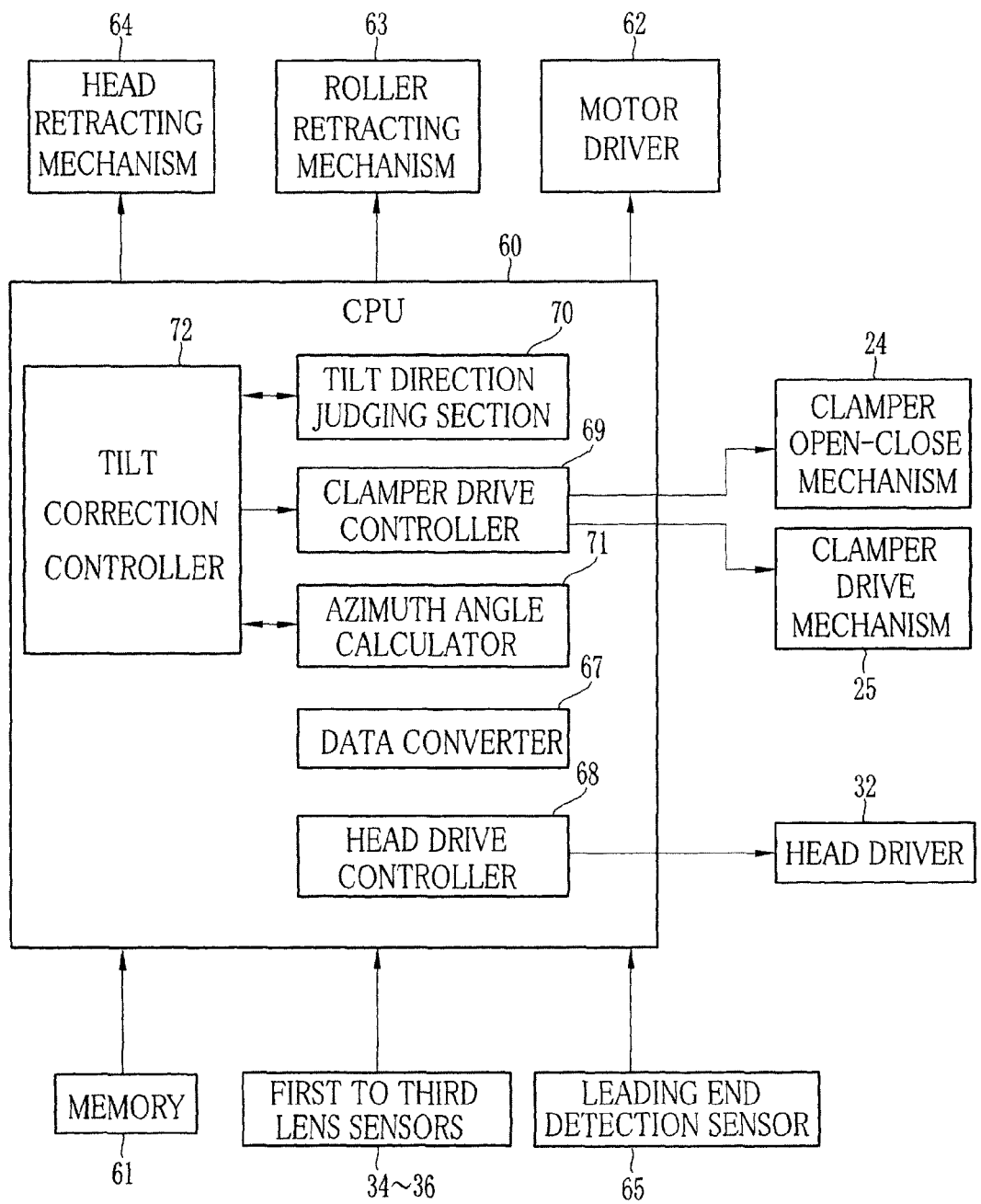
FIG. 6 is a block diagram illustrating the circuitry of the printer.

As shown in FIG. 6, a CPU 60 controls overall components of the printer 2. Beside the above clamper open-close mechanism 24, the clamper drive mechanism 25, the head driver 32 and the lens sensors 34 to 36, a memory 61, a motor driver 62, a roller retracting mechanism 63, a head retracting mechanism 64, and a leading end detecting sensor 65 are also connected to the CPU 60.

The memory 61 stores various programs and data for controlling the printer 2. The CPU 60 reads out these programs and data from the memory 61 and processes them to control the printer 2. The memory 61 has a RAM area that functions as a work memory served for the CPU 60 to execute processing as well as a temporary storage for various data.

The motor driver 62 drives or stops the motor 21 according to control signals from the CPU 60, to rotate or stop the capstan roller 15a. The roller retracting mechanism 63 is for moving the pinch roller 15b to the nip position or the release position according to control signals from the CPU 60. The head retracting mechanism 64 is for moving the thermal head 16 to the pressing position or the retracted position according to control signals from the CPU 60.

The leading end detecting sensor 65 (see FIG. 5) is located near the above-mentioned clamp position on the upstream side thereof. The leading end detecting sensor 65 is an optical sensor like the lens sensors 34 to 36, and outputs a detection signal to the CPU 60, indicating that the leading end of the lenticular sheet 3 has passed by the leading end detecting sensor 65.

Sequentially executing the programs readout from the memory 61, the CPU 60 functions as a data converter 67, a head drive controller 68, a clamper drive controller 69, a tilt direction judging section 70, an azimuth angle calculator 71, or a tilt correction controller (attitude correction controller) 72. The clamper drive controller 69, the tilt direction judging section 70, the azimuth angle calculator 71 and the tilt correction controller 72 correspond to the control section of the present invention.

The data converter 67 reads out the image data of the two viewpoint images from the memory 61, processes these viewpoint images to convert into image data of six viewpoints. The head drive controller 68 controls driving the thermal head 16 through the head driver 32.

The clamper drive controller 69 controls the clamper open-close mechanism 24 to switch the clamper 23 between the closed state and the open state. The clamper drive controller 69 controls the clamper drive mechanism 25 to move the clamper 23 in the sub scan direction or turn the clamper 23.

The tilt direction judging section 70 analyzes the detection signals output from the first to third lens sensors 34 to 36 to determine the tilt direction when the longitudinal direction of the lenses 4 tilts relative to the main scan direction. The azimuth angle calculator 71 calculates an azimuth angle from the detection signals from the first to third lens sensors 34 to 36 and the known distances S1 and S3 between the lens sensors 34 to 36.

The tilt correction controller 72 controls the clamper drive controller 69 to execute the tilt correction (attitude correction) on the basis of the judgment by the tilt direction judging section 70 and the calculation result of the azimuth angle calculator 71, so as to turn the clamper 23 to make the longitudinal direction of the lenses 4 parallel to the main scan direction. The tilt correction is executed in two steps: rough adjustment and fine adjustment.

In the rough adjustment, an azimuth angle is determined based on the detection signals from the first and second lens sensors 34 and 35 and the distance S1 (hereinafter referred to as the azimuth angle for rough adjustment), and on the basis of this azimuth angle for rough adjustment, the lenticular sheet 3 is turned to correct the tilt of the lenses 4. The fine adjustment consists of determining an azimuth angle based on the detection signals from the first and third lens sensors 34 and 36 and the distance S3 (hereinafter referred to as the azimuth angle for fine adjustment), and correcting the tilt of the lenses 4 on the basis of this azimuth angle for fine adjustment.

The CPU 60 has other functions than the functions of the above-described components, such as a detector for detecting positional relationship between the lenticular sheet 3 and the clamper 23, and positional relationship between the lenticular sheet 3 and the heating element array 16a.

Positional relationship between the lenticular sheet 3 and the clamper 23 is determined based on the transport amount of the lenticular sheet 3 from a reference position that is where the lenticular sheet 3 exists at the moment when the detection signal from the leading end detecting sensor 65 is entered. Positional relationship between the lenticular sheet 3 and the heating element array 16a is determined based on the transport amount of the lenticular sheet 3 from a peak point of the detection signal, positional relationship in the sub scan direction between the lens sensors and the lenses 4 at the peak point of the detection signal, distance between the azimuth angle detector 18 and the heating element array 16a, lens pitch between the lenses 4, and other factors.

The tilt correction of the lenses 4 (correction of the attitude of the lenticular sheet 3), carried out in two steps including the rough adjustment and the fine adjustment, will now be described specifically. In the tilt correction, even while the lenses 4 are tilting relative to the main scan direction, if corresponding points (e.g. the peaks 4b) of three different lenses 4 move past the lens sensors 34 to 36 respectively at the same time, the detection signals from the lens sensors 34 to 36 will reach the peak coincidentally with each other (see FIG. 13B). In that case, it is impossible to correct the tilt of the lenses 4. For this reason, the attitude of the lenticular sheet 3 during the transport is controlled more accurately for example using the left and right skew regulation guides 57 and 58, thereby to restrict the tilt of the lenses 4 to some extent at the moment when the lenticular sheet 3 is clamped by the clamper 23.

Figure 7:
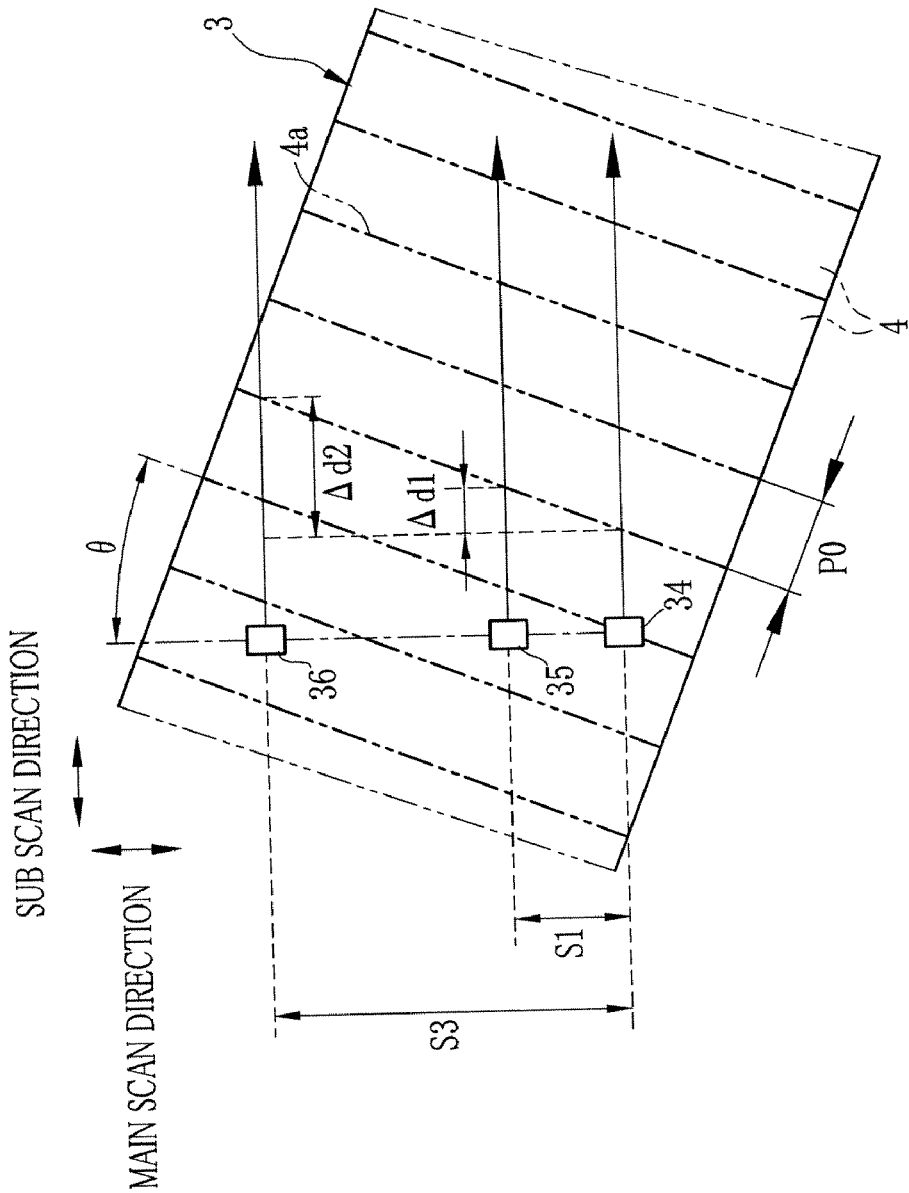
FIG. 7 is an explanatory diagram illustrating the distance between the first lens sensor and the second lens sensor.

Specifically, the tilt of the lenses 4 will be controlled in a manner as set forth below. As shown in FIG. 7, a transport length of the lenticular sheet 3 in a period from when one lens 4 is detected by either one of the first and second lens sensors 34 and 35 till when the same lens 4 is detected by the other sensor (a difference between the distances in the sub scan direction from the first lens sensor 34 to the one lens 4 and from the second lens sensor 35 to the same lens 4) will be depicted as a shift amount $\Delta d1$. Providing that P0 represents a lens pitch of the lenses 4, the attitude of the lenticular sheet 3 is controlled to satisfy a condition Δd1<P0 during the transport.

For example, where the lens pitch P0 is 0.254 mm, the distance S1 is 30 mm, and Δd1 is 0.254 mm, the azimuth angle θ will be θ=tan$^{-1}$ (0.254/30)=0.485°. Providing that the distance S3 between the first lens sensor 34 and the second lens sensor 36 is 130 mm, a shift amount Δd2 indicating a difference between the distances in the sub scan direction from the first lens sensor 34 to one lens 4 and from the third lens sensor 36 to the same lens 4 will be (0.254×130/30)=1.1 mm. This is 4.33 (=1.1/0.254) times as long as the lens pitch P0. Accordingly, by regulating the attitude of the lenticular sheet 3 during the transport so as to restrict the shift amount Δd2 within 1.00 mm, the condition Δd1<P0 will be satisfied without fail.

The magnitude of the shift amount Δd1 varies with a change in distance S1 between the first and second lens sensors 34 and 35. Therefore, instead of regulating the attitude of the lenticular sheet 3 during the transport, the distance S1 may be adjusted so as to satisfy the condition Δd1<P0.

At the start of the tilt correction, the clamper drive controller 69 controls the clamper drive mechanism 25 such that the clamper 23 conveys the lenticular sheet 3 in the sub scan direction so that the lenticular sheet 3 passes through the respective lens sensors 34 to 36. At that time, the detection signals output from the lens sensors 34 to 36 are fed to the CPU 60. Then, the tilt correction controller 72 actuates the tilt direction judging section 70.

As shown in FIGS. 8 (A) and (B), the tilt direction judging section 70 analyzes binary signals from the first to third lens sensors 34 to 36 to determine the tilt direction of the lenses 4. In FIG. 8 (as well as in FIG. 9), the detection signals are depicted to have their peaks at the borders between the lenses 4, in order to avoid complicating the drawings and clarify the relationship between the lens sensors 34 to 36 and the lenses 4 to be detected. In practice, however, the detection signals reach the peak at the peak 4b of each lens 4, as shown in FIG. 4B.

The tilt direction judging section 70 determines a transport length LA of the lenticular sheet 3 in a period from when the detection signal of the first lens sensor 34 reaches the peak till when the detection signal of the second lens sensor 35 thereafter reaches the peak. The transport length LA is determined based on the number of drive pulses applied to the left and right motors (pulse motors) 49 and 50, which are drive sources for the clamper drive mechanism 25.

The shift amount Δd1 as illustrated in FIG. 7 is less than the lens pitch P0 at that time. Therefore, if the lenses 4 tilt clockwise, the first to third lens sensors 34 to 36 will sequentially detect the same border 4a in this order, and the transport length LA will represent a transport length in a period from when the first lens sensor 34 detects a border 4a between the lenses 4 till when this border 4a is detected by the second lens sensor 35.

Then the tilt direction judging section 70 calculates the azimuth angle θ on the basis of the determined transport length LA and the known distance S1 between the first and second lens sensors 34 and 35, using the following formula (1). Thereafter, on the basis of the calculated azimuth angle θ and the known distance S3 between the first and third lens sensors 34 and 36, the tilt direction judging section 70 calculates an estimated value of a transport length LB until the border 4a previously detected by the first lens sensor 34 is detected by the third lens sensor 36.

$$\theta = \tan^{-1}(LA/S1) \quad (1)$$

$$LB = S3 \times \tan\theta \quad (2)$$

The tilt direction judging section 70 checks whether the detection signal of the third lens sensor 36 reaches the peak at a position corresponding to the transport length LB with reference to the time when the first lens sensor 34 previously detected the border 4a. If the lenses 4 tilt clockwise, the detection signal of the third lens sensor 36 will reach the peak in a position around the corresponding position to the transport length LB. Accordingly, in this case, the tilt direction judging section 70 judges that the lenses 4 tilt clockwise.

On the other hand, as shown in FIG. 9, if the lenses 4 tilt counterclockwise and the same lens border 4a is sequentially detected by the third to first lens sensors 36 to 34 in this order, the transport length LA represents a transport length in a period from when the first lens sensor 34 detects the border 4a till when the second lens sensor 35 detects the next border 4a. Therefore, if the azimuth angle θ is calculated on the basis of the transport length LA in the same way as above, the calculated value will differ from the actual azimuth angle θ of the lenses 4. Accordingly, if the estimated value of the transport length LB is calculated on the basis of this calculation result, the detection signal of the third lens sensor 36 will not have the peak value at a position corresponding to this transport length LB. In that case, the tilt direction judging section 70 judges that the lenses 4 tilt counterclockwise.

Figure 10:
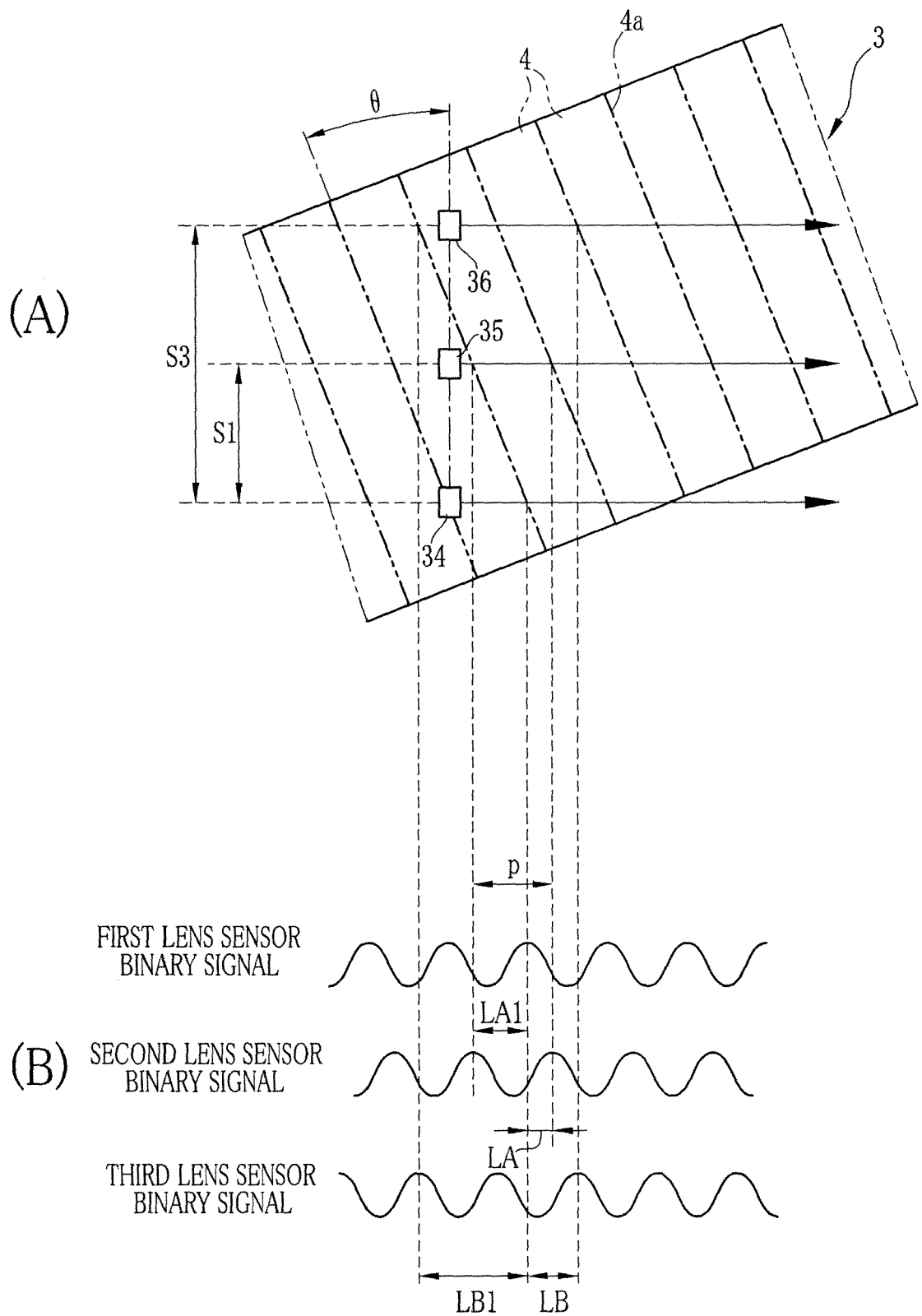
FIG. 10 is an explanatory diagram illustrating a situation where the lens sensors are spaced at equal intervals.

Conversely, where the lens sensors 34 to 36 are spaced equally from each other, as shown in FIG. 10, the detection signal of the third lens sensor 36 will also reach the peak at the position corresponding to the estimated transport length LB even while the lenses 4 tilt counterclockwise for example in the same way as shown in FIG. 9 (A). In that case the tilt direction of the lenses 4 cannot be determined. This is because a transport length LB1 in a period till the border 4a previously detected by the third lens sensor 36 is detected by the first lens sensor 34, and the transport length LB sums up to be twice a wave pitch "p" of the detection signal, as determined by the following formulas (a) to (d). Note that LA1 in the following formula represents a transport length in a period till the border previously detected by the third lens sensor 36 is detected by the second lens sensor 35. Consequently, arranging the lens sensors 34 to 36 at unequal intervals like in the present invention will achieve precise judgment on the tilt direction.

$$S3 = 2 \times S1 \quad (a)$$

$$LB1 = LA1 \times (S3/S1) = 2(LA1) \quad (b)$$

$$LB = LA \times (S3/S1) = (p-LA1) \times 2 = 2(p-LA1) \quad (c)$$

$$LB1 + LB = 2(LA1) + 2(p-LA1) = 2p \quad (d)$$

The result of judgment by the tilt direction judging section 70 is input to the tilt correction controller 72. In the following description, a case where the lenses 4 tilt counterclockwise will be discussed. After the tilt direction is judged, the tilt correction controller 72 actuates the azimuth angle calculator 71 to start calculating the azimuth angle for rough judgment.

Figure 11:
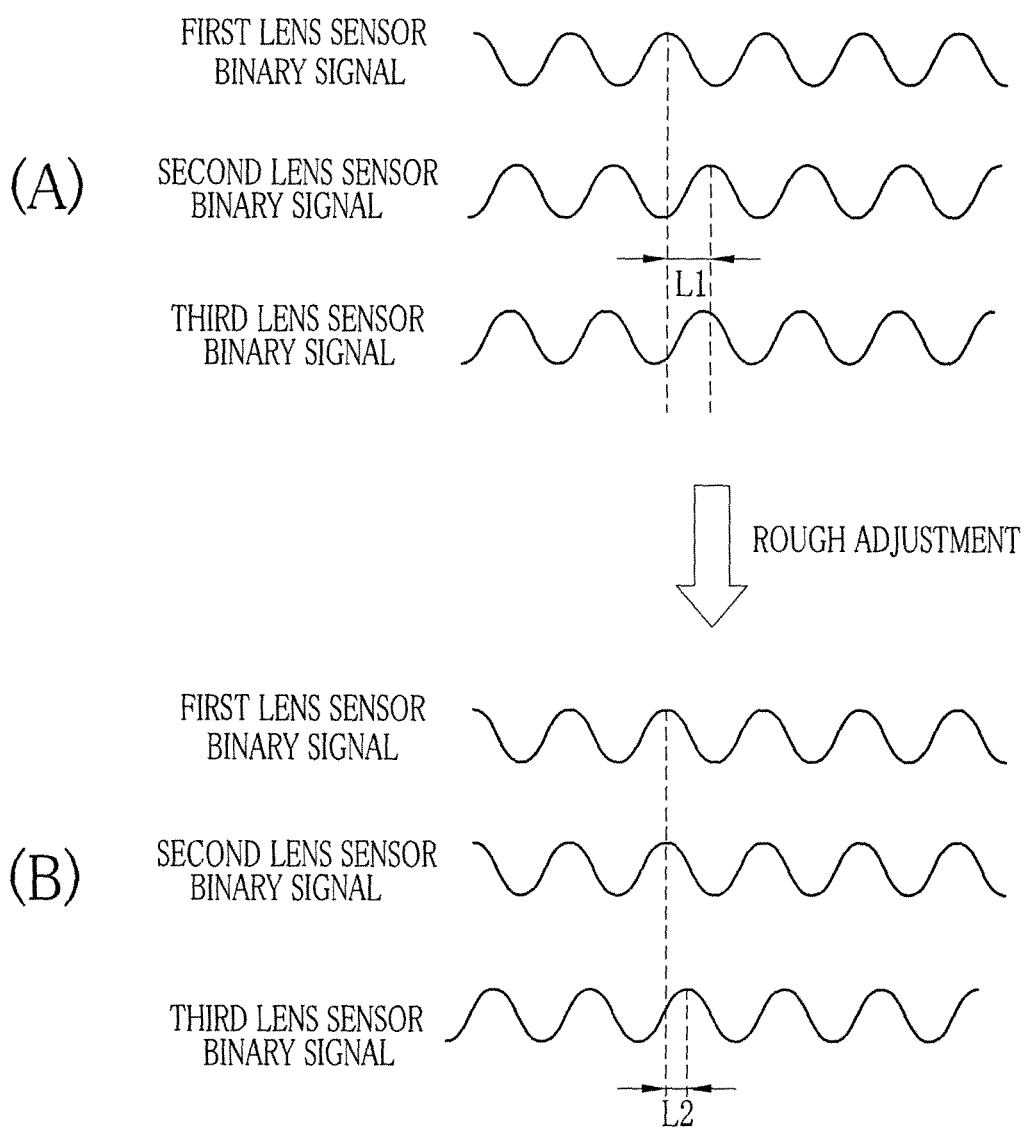
FIG. 11 is an explanatory diagram illustrating tilt correction of the lenticular lenses, wherein (A) illustrates rough adjustment, and (B) illustrates fine adjustment.

As shown in FIG. 11 (A), the azimuth angle calculator 71 determines the magnitude of a transport length L1 from a reference point, at which the detection signal of the first lens sensor 34 reaches the peak, to the nearest peak of the detection signal of the second lens sensor 35 to the reference point. The magnitude of this transport length L1 may be determined from the number of pulses applied to the left and right motors 49 and 50. Then the azimuth angle calculator 71 substitutes the obtained transport length L1 for the transport length LA in the above formula (1) to calculate the azimuth angle for rough adjustment.

If the nearest peak of the detection signal of the second lens sensor 35 is behind the peak of the detection signal of the first lens sensor 34, this peak corresponds to an identical border 4a that the first lens sensor 34 has previously detected. Therefore, the azimuth angle for rough adjustment will be approximately equal to the actual azimuth angle $\theta$ of the lenses 4 between the first and second lens sensors 34 and 35.

Conversely, if the nearest peak of the detection signal of the second lens sensor 35 is ahead of the peak of the detection signal of the first lens sensor 34, this peak corresponds to the preceding border 4a to the border 4a that the first lens sensor 34 has previously detected. Therefore, the azimuth angle for rough adjustment as calculated in this case will differ from the actual azimuth angle $\theta$ of the lenses 4 between the first and second lens sensors 34 and 35. However, this is no problem because it is unnecessary to align the longitudinal direction of the lenses 4 to be precisely parallel to the main scan direction in the rough adjustment.

The azimuth angle for rough adjustment determined by the azimuth angle calculator 71 is input to the tilt correction controller 72. The tilt correction controller 72 generates a tilt correction command to the clamper drive controller 69 to correct the tilt of the lenses 4 on the basis of the tilt direction and the azimuth angle for rough adjustment. In response to this tilt correction command, the clamper drive controller 69 controls the clamper drive mechanism 25 to interrupt transport of the clamper 23 in the sub scan direction and then turn the clamper 23 so as to set the azimuth angle for rough adjustment to zero. Thus, the tilt of the longitudinal direction of the lenses 4 relative to the main scan direction is roughly adjusted.

After the completion of the above rough adjustment, the clamper drive controller 69 controls the clamper drive mechanism 25 to transport the lenticular sheet 3 again in the sub scan direction. Then the tilt correction controller 72 actuates the azimuth angle calculator 71 to start calculating an azimuth angle for fine adjustment.

As shown in FIG. 11 (B), the azimuth angle calculator 71 calculates the magnitude of a transport length L2 from a reference point corresponding to a peak of the detection signal of the first lens sensor 34 to the nearest peak of the detection signal of the third lens sensor 36 to the reference point in the basically same way as in the calculation for the azimuth angle for rough adjustment. Then the azimuth angle calculator 71 substitutes the obtained transport length L2 for the transport length LA in the above formula (1) to calculate the azimuth angle for fine adjustment.

The azimuth angle for fine adjustment will be approximately equal to the actual azimuth angle $\theta$ of the lenses 4. Since the azimuth angle for fine adjustment is calculated after the rough adjustment, the azimuth angle $\theta$ of the lenses 4 has been sufficiently reduced. Therefore, if the lenses 4 still tilt counterclockwise in this stage, the peak of the detection signal of the third lens sensor 36 will come behind the peak of the detection signal of the first lens sensor 34. On the other hand, when the lenses 4 tilt clockwise, the peak of the detection signal of the third lens sensor 36 will come ahead of the peak of the detection signal of the first lens sensor 34.

The azimuth angle for fine adjustment determined by the azimuth angle calculator 71 is input to the tilt correction controller 72. The tilt correction controller 72 generates a tilt correction command to the clamper drive controller 69 on the basis of the tilt direction and the azimuth angle for fine adjustment. In response to this tilt correction command, the transport of the clamper 23 in the sub scan direction is interrupted and, thereafter, the clamper 23 is turned to set the azimuth angle for fine adjustment to zero in the same way as in the rough adjustment. Thus, the tilt of the longitudinal direction of the lenses 4 relative to the main scan direction is finely adjusted.

After the end of the fine adjustment, the clamper drive controller 69 controls the clamper drive mechanism 25 to transport the lenticular sheet 3 in the sub scan direction. The tilt correction controller 72 compares the detection signals from the first to third lens sensors 34 to 36, and finishes the tilt correction if the shift amounts between the respective peaks are not more than a predetermined amount. If any of the shift amounts is more than the predetermined amount, the rough and fine adjustments are carried out again. Thus the tilt correction of the lenses 4 is entirely completed.

Figure 12:
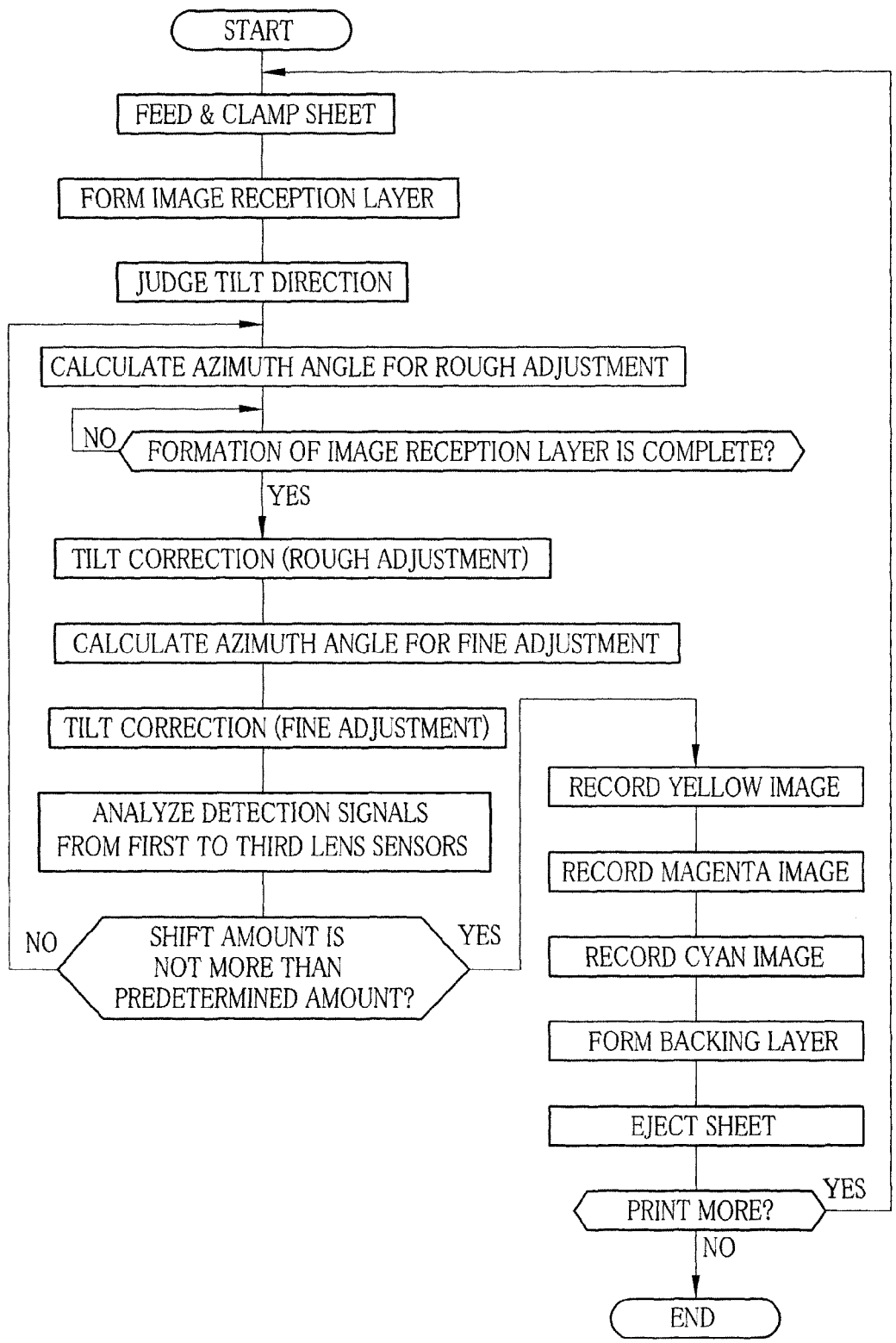
FIG. 12 is a flowchart illustrating an image recording process in the printer.

Next, printing on the lenticular sheet will be described with reference to the flowchart shown in FIG. 12. First, image data of two viewpoint images of the same scene, which are viewed from different viewpoints, is fed to an input I/F (not shown) of the printer 2. These two viewpoint images are temporarily stored as parallax images in the memory 61. The data converter 67 of the CPU 60 reads out the image data of the two viewpoint images from the memory 61 to convert it to image data of six viewpoint images, and stores the image data again in the memory 61.

Upon a command to start printing, the CPU 60 confirms that the thermal head 16 is in the retracted position. The clamper drive controller 69 of the CPU 60 controls the clamper drive mechanism 25 on the basis of detection results from a not-shown detecting sensor for the rotational position of the clamper 23, e.g. a rotary encoder or the like, so as to set the clamper 23 substantially parallel to the main scan direction. Thereafter the clamper drive controller 69 moves the clamper 23 to the clamp position and then drives the clamper open-close mechanism 24 to switch the clamper 23 to the open state.

After the clamper 23 is switched to the open state, a sheet 3 is fed into the transport track 12 through the feed-in slot 11. When a feed detecting sensor (not shown) detects this feeding, the CPU 60 controls the motor driver 62 to run the motor 21. Thereby the lenticular sheet 3 is nipped between the rotating feed roller pair 15 and thus transported to the downstream side of the transport track 12. The lenticular sheet 3 passes through a gap between the retracted thermal head 16 and the platen roller 17, and moves past the azimuth angle detector 18, so that the leading end of the lenticular sheet 3 comes in the vicinity of the clamper 23 and is detected by the leading end detecting sensor 65.

When the leading end of the lenticular sheet 3 is detected by the leading end detecting sensor 65, the CPU 60 controls the feed roller pair 15 to transport the lenticular sheet 3 farther by a constant length so as to set the leading end of the lenticular sheet 3 in a position where the clamper 23 can clamp it. Then the CPU 60 stops the motor 21 to stop transporting the lenticular sheet 3.

After the transport of the lenticular sheet 3 stops, the clamper drive controller 69 controls the clamper open-close mechanism 24 to switch the clamper 23 to the closed state. Thus the leading end of the lenticular sheet 3 is clamped by the clamper 23. After this clamping, the CPU 60 controls the roller retracting mechanism 63 to release the nip of the feed roller pair 15 on the lenticular sheet 3.

Then the CPU 60 actuates the film changing mechanism 30 to set the image reception layer film 27 underneath the thermal head 16 and thereafter drives the head retracting mechanism 64 to move the thermal head 16 to the pressing position. Thus the thermal head 16 is set to press the image reception layer film 27 onto the reverse surface of the lenticular sheet 3.

After the thermal head 16 is brought to the pressing position, the clamper drive controller 69 drives the clamper drive mechanism 25 to move the clamper 23 to the downstream side. Thus the lenticular sheet 3 starts being conveyed in the sub scan direction. Synchronously with this, the image reception layer film 27 is also advanced.

After starting transporting the lenticular sheet 3, the CPU 60 monitors the transport length of the lenticular sheet 3 on the basis of the number of drive pulses applied to the left and right motors 49 and 50 of the clamper drive mechanism 25. The head drive controller 68 of the CPU 60 instructs the head driver 32 to form the image reception layer when it is determined that the recording area of the lenticular sheet 3 comes close to the thermal head 16.

Upon the instruction from the head drive controller 68, the head driver 32 supplies electric power of a uniform amount to the two rows of heating element array 16*a* to generate heat energy for heating the image reception layer film 27. Thus the image reception layer film 27 is uniformly heated to transfer the transparent image reception layer of two lines which are elongated in the main scan direction, into the micro segment 5*a* for instance.

After the two lines of image reception layer are formed within the micro segment 5*a*, the clamper drive controller 69 controls the clamper drive mechanism 25 to transport the lenticular sheet 3 toward the downstream by a transport length corresponding to ⅙ of the previously determined lens pitch P0. This intermittent transport amount corresponds to a width of recorded two stripe images (two lines), and is equal to the width (42 μm) of each micro segment. Concurrently with this, the image reception layer film 27 is moved by two lines (P0/6). After this movement, the thermal head 16 is driven again to heat the image reception layer film 27. As a result, two lines of image reception layer are newly formed in the micro segment 5*b* adjacently to the previously formed two lines of image reception layer.

In the same way, while the lenticular sheet 3 and the image reception layer film 27 are being transported, the image reception layer is formed seriatim in two lines at a time to form the transparent image reception layer finally in the whole recording area. Since the tilt correction of the lenses 4 has not been done in this image reception layer forming process, the range in which an image is recorded afterward can deviate from the recording area of the image reception layer. For this reason, the image reception layer should be formed in a wider range than the image recording range in order to prevent the deviation of the image from the image reception layer.

While the image reception layer is being formed, data for the tilt correction of the lenses 4 is collected on the basis of the detection signals from the lens sensors 34 to 36. First is started judgment on the tilt direction of the lenses 4. In the present invention, three lens sensors are arranged in the main scan direction at uneven intervals, whereby the tilt direction judging section 70 can judge the tilt direction of the lenses 4 on the basis of the detection signals from the lens sensors 34 to 36, as illustrated in FIGS. 8 and 9. After the judgment on the tilt direction, the azimuth angle calculator 71 calculates the azimuth angle for rough adjustment on the basis of the detection signals from the first and second lens sensors 34 and 35, as illustrated in FIG. 11(A).

The tilt direction of the lenses 4 and the azimuth angle for rough adjustment are input to the tilt correction controller 72. The tilt correction controller 72 starts executing the correction based on the tilt direction and the azimuth angle for rough adjustment when the image reception layer is fully formed. First, the CPU 60 controls the head retracting mechanism 64 to move the thermal head 16 to the retracted position. At the same time, the clamper drive controller 69 controls the clamper drive mechanism 25 to interrupt the transport of the lenticular sheet 3 and the image reception layer film 27. Next, the tilt correction controller 72 gives a tilt correction command to the clamper drive controller 69. As a result, the clamper 23 turns to set the azimuth angle for rough adjustment to zero. Thus the lenticular sheet 3 changes its attitude to make the rough adjustment of the tilt in the longitudinal direction of the lenses 4 relative to the main scan direction.

After the rough adjustment is accomplished, the clamper drive controller 69 drives the clamper drive mechanism 25 to transport the lenticular sheet 3 to the downstream side. During this transport of the lenticular sheet 3, the azimuth angle calculator 71 calculates the azimuth angle for fine adjustment on the basis of the detection signals from the first and third lens sensors 34 and 36, as illustrated in FIG. 11(B). After this calculation, the transport of the lenticular sheet 3 is stopped, and then the clamper 23 is turned to set the azimuth angle for fine adjustment to zero on the basis of the result of judgment on the tilt direction and the calculation result of the azimuth angle for fine adjustment, to make the fine adjustment of the tilt in the longitudinal direction of the lenses 4 relative to the main scan direction.

As described so far, the tilt correction of the lenses 4 is executed in two steps: the rough adjustment that is executed based on the detection signals from the first and second lens sensors 34 and 35 spaced at a smaller distance, and the fine adjustment that is executed based on the detection signals from the first and third lens sensors 34 and 36 spaced at a greater distance. Thus the longitudinal direction of the lenses 4 can be adjusted to be parallel to the main scan direction. Particularly because the error between the calculated azimuth angle and the actual azimuth angle θ decreases as the spacing between the lens sensors increases, the fine adjustment will enhance the accuracy of the tilt correction of the lenses 4. Moreover, since the azimuth angles for rough adjustment and fine adjustment can be easy to calculate, the tilt correction can be accomplished in a short time.

After the completion of the fine adjustment, the shift amounts between the peaks of the detection signals of the lens sensors 34 to 36 are measured while the lenticular sheet 3 is being transported to the downstream side (or to the upstream side). If the shift amounts are not more than the predetermined amount, the tilt correction is judged to be accomplished. If any shift amount is above the predetermined amount, the tilt correction is judged to be unaccomplished, and the rough and fine adjustments are executed again in the above described procedures.

When the tilt correction is judged to be accomplished, the transport of the lenticular sheet 3 to the downstream side is interrupted, and the lenticular sheet 3 is returned to the upstream side through the clamper drive mechanism 25. The lenticular sheet 3 may also be transported to the downstream side till its trailing end moves past the azimuth angle detector 18 and, thereafter, transported to the upstream side. During this returning movement, the lenticular sheet 3 is introduced into the backward transport track 12*a*.

While the lenticular sheet 3 is being returned, the CPU 60 determines a point when the detection signal of any one of the lens sensors 34 to 36 reaches the peak. On the basis of the transport amount of the lenticular sheet 3 from this peak point, the positional relationship between the lens sensor and the lenses 4 in the sub scan direction at the peak point, the distance between the azimuth angle detector 18 and the heating element array 16*a*, the lens pitch P0 and other factors, the positional relationship between the lenticular sheet 3 and the heating element array 16a is detected.

It is to be noted that when the tilt correction is complete the lens pitch P0 will coincide with the transport length of the lenticular sheet 3 in a cycle of the detection signal of any one of the lens sensors 34 to 36, e.g. from one peak to the next peak of the detection signal. Therefore the lens pitch P0 may be determined by the detection signal of any one of the lens sensors 34 to 36.

When a leading edge of the recording area on the lenticular sheet 3 moves past the position at the thermal head 16, the clamper drive controller 69 controls the clamper drive mechanism 25 to stop transporting the lenticular sheet 3. Next, the CPU 60 actuates the film changing mechanism 30 to set the ink film 28 underneath the thermal head 16 and thereafter controls the head retracting mechanism 64 to move the thermal head 16 to the pressing position. This time the yellow ink area of the ink film 28 is laid on the reverse surface of the lenticular sheet 3.

After the thermal head 16 is pressed on, the clamper drive controller 69 controls the clamper drive mechanism 25 to restart transporting the lenticular sheet 3 to the downstream side. Also in this stage, the CPU 60 continues monitoring the positional relationship between the lenticular sheet 3 and the heating element array 16a. Thereafter when the heating element array 16a is located in the first micro segment 5a of the recording area, the head drive controller 68 reads out two adjacent lines of yellow image from the memory 61, for example, from the first viewpoint image among the six viewpoint images, and sends them to the head driver 32.

The head driver 32 drives the thermal head 16 on the basis of the two lines of yellow image data, to cause the two rows of heating element array 16a to generate heat energy to heat the ink film 28 from the back. Thereby the yellow ink sublimated from the ink film 28 is put on the image reception layer in the micro segment 5a. As a result, two lines of stripe images in the yellow image are recorded in parallel within the micro segment 5a.

After the recording in the micro segment 5a, the clamper drive controller 69 controls the clamper drive mechanism 25 to transport the lenticular sheet 3 to the downstream by a transport length corresponding to ⅙ of the lens pitch P0. Along with the lenticular sheet 3, the ink film 28 is wound up to oppose an unused portion of the yellow ink area to the thermal head 16 in place of the used portion. After this transport, the head drive controller 68 reads out yellow image data of two adjacent lines of the second viewpoint image from the memory 61, and sends it to the head driver 32. Then the head driver 32 drives the two rows of heating element array 16a to generate heat energy to record two lines of stripe images of the yellow image in the micro segment 5b.

In the same way as above, each after the lenticular sheet 3 and the ink film 28 are transported by the length corresponding to ⅙ of the lens pitch P0, the two rows of heating element array 16a are sequentially driven on the basis of two lines of yellow image data to generate heat energy to record the stripe images of the first to sixth viewpoint images respectively in the micro segments 5a to 5f, two lines in each segment.

When the recording of the respective yellow images of the first to sixth viewpoint images is finished, the clamper driver controller 69 controls the clamper drive mechanism 25 to stop the clamper 23 from transporting the lenticular sheet 3. Then the CPU 60 controls the head retracting mechanism 64 to move the thermal head 16 to the retracted position. Thereafter the clamper drive controller 69 controls the clamper drive mechanism 25 to return the lenticular sheet 3 to the upstream and, when the leading end of the recording area goes by the position of the thermal head 16 during this returning movement, stop the transport.

Next, the CPU 60 actuates the film changing mechanism 30 to feed the ink film 28 so as to set the magenta ink area underneath the thermal head 16. Then the CPU 60 controls the head retracting mechanism 64 to move the thermal head 16 to the pressing position. In the same way as for the above yellow image, while the lenticular sheet 3 and the ink film 28 are being intermittently transported to the downstream side, respective magenta images of the first to sixth viewpoint images are subdivided into the stripe images and recorded on the reverse surface of the lenticular sheet 3, atop the stripe images of the yellow images. After the recording of the magenta images is complete, cyan images are recorded on the lenticular sheet 3 in the same procedures.

After the three color images are recorded in the recording area, the lenticular sheet 3 is temporarily returned to the upstream. At the same time, the film changing mechanism 30 is driven to move the backing layer film 29 to a work position, and then the thermal head 16 is moved to the pressing position. Then the lenticular sheet 3 is again transported intermittently to the downstream, while the thermal head 16 is driven to form the backing layer on top of the recording area having the three color images recorded thereon. The backing layer protects the three color images and also raises the reflection factor to brighten the colors.

After forming the backing layer, the CPU 60 controls the head retracting mechanism 64 to move the thermal head 16 to the retracted position. Then the clamper drive controller 69 controls the clamper drive mechanism 25 to move the clamper 23 to the clamp position and feed the lenticular sheet 3 into the backward transport track 12a. After this movement, the clamper drive controller 69 controls the clamper open-close mechanism 24 to switch the clamper 23 to the open state. Thus the clamp on the leading end of the lenticular sheet 3 is released, and the lenticular sheet 3 is ejected through the feed-out slot. The above processes are repeatedly executed to print other sheets 3.

Next the second embodiment of the present invention will be described. In the second embodiment, the distances between first to third lens sensors 34 to 36 are so adjusted as to prevent the detection signals of the lens sensors 34 to 36 from reaching the peaks coincidentally although the longitudinal direction of the lenses 4 tilts relative to the main scan direction. Note that the second embodiment has the same features as the above first embodiment except that the distances between the lens sensors 34 to 36 differ from each other. So those having the same function or structure as the above first embodiment will be designated by the same reference numerals and the description thereof will be omitted (the same applies to the third embodiment).

Figure 13A:
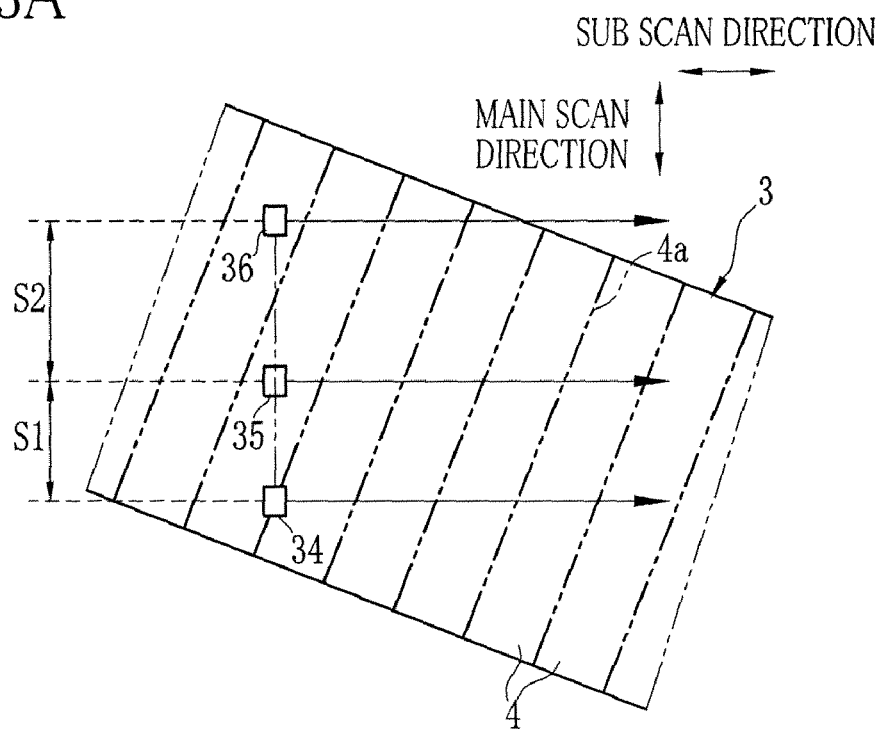
FIG. 13A is an explanatory diagram illustrating a second embodiment, wherein distances S1 and S2 are adjusted so as not to have any common divisor except "1"

As shown in FIG. 13A, in the second embodiment, the distance S1 between the first and second lens sensors 34 and 35 and the distance S2 between the second and third lens sensors 35 and 36 are adjusted to be in the relation of prime numbers that they have no common divisor except "1".

Figure 13B:
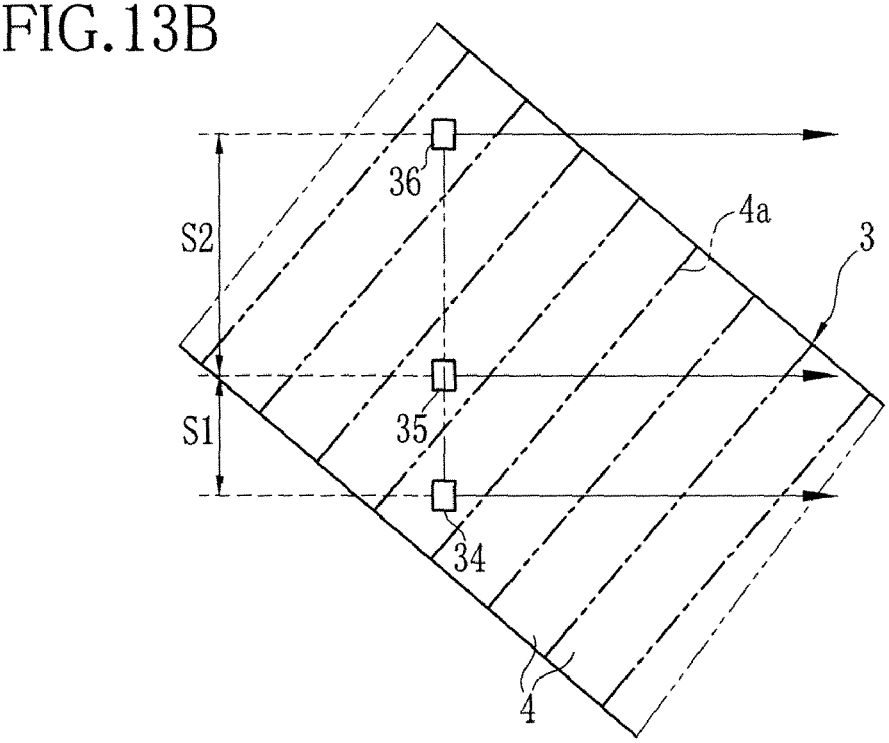
FIG. 13B is an explanatory diagram illustrating a second embodiment, wherein distances S1 and S2 are adjusted so as to have some common divisor other than "1"

In contrast, where the distances S1 and S2 are in such a relation that they have a common divisor or common divisors other than "1", as shown in FIG. 13B, the peaks of the detection signals from the lens sensors 34 to 36 will definitely coincide with each other in certain rotational positions of the lenticular sheet 3 where the longitudinal direction of the lenses 4 is not parallel to the main scan direction. In view of this, it will be understood that, where the distance S1 and the distance S2 satisfy the relation of prime numbers, the peaks of the detection signals from the lens sensors 34 to 36 will not coincide with each other unless the longitudinal direction of the lenses 4 is parallel to the main scan direction.

In this way, the second embodiment adjusts the distance S1 and the distance S2 appropriately, thereby to prevent the detection signals of the lens sensors 34 to 36 from having peaks coincidentally despite the tilt of the longitudinal direction of the lenses 4 relative to the main scan direction. Moreover, flexibility in arranging the lens sensors 34 to 36 may be improved in comparison with the first embodiment.

It is to be note that the tilt correction of the lenses 4 may be carried out in two steps in the second embodiment like in the first embodiment. It is also possible to turn the lenticular sheet 3 while monitoring the detection signals from the lens sensors 34 to 36 until the peaks of the respective detection signals coincide with each other. In this case, the calculation process as executed in the first embodiment would be unnecessary, and the possibility of false detection is eliminated because those conditions where the peaks of the detection signals from the lens sensors 34 to 36 will coincide with each other may be determined.

Next the third embodiment of the present invention will be described. Like the second embodiment, the third embodiment is configured to prevent detection signals of lens sensors 34 to 36 from having peaks coincidentally despite the tilt of the longitudinal direction of the lenses 4 relative to the main scan direction.

Figure 14:
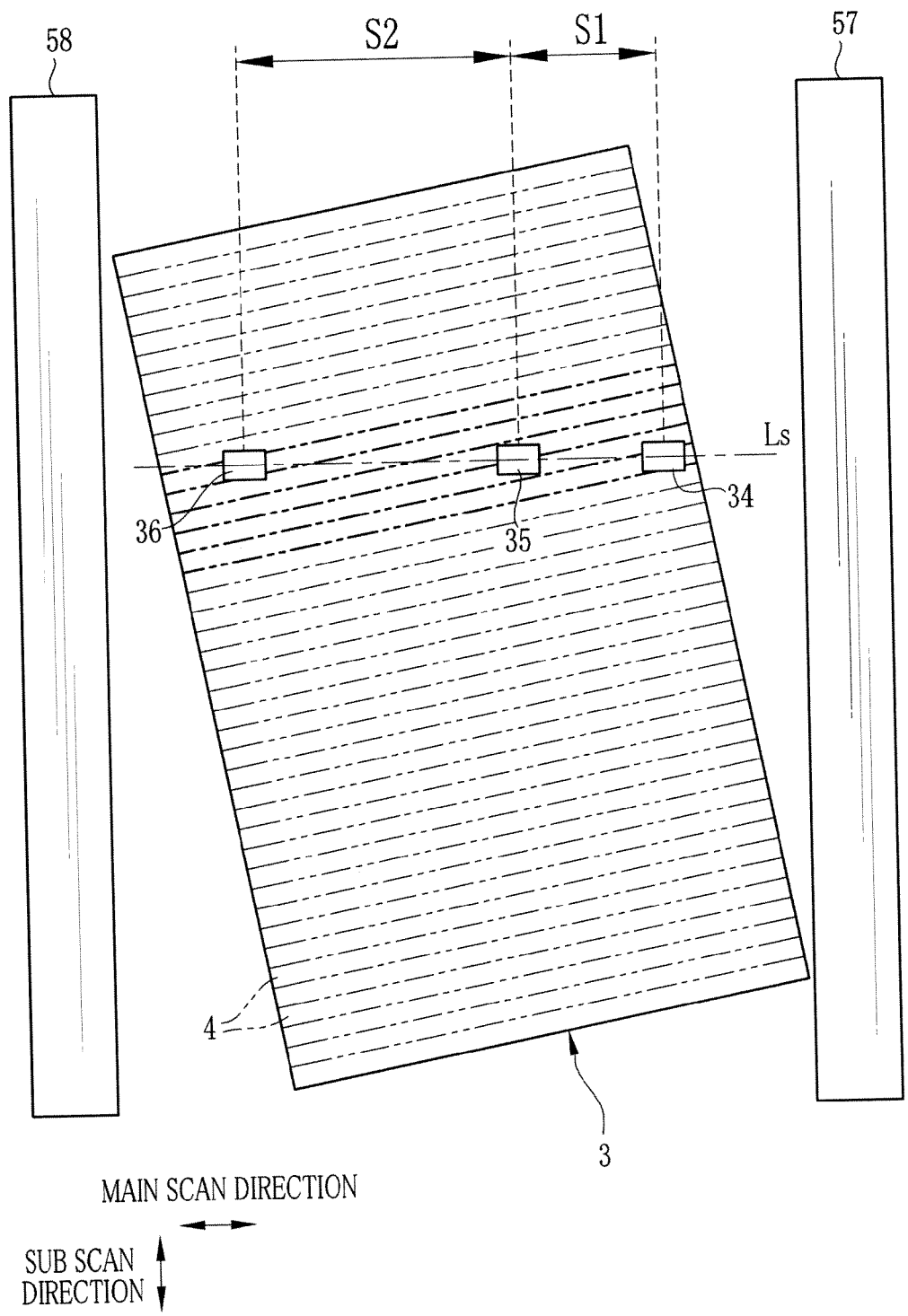
FIG. 14 is an explanatory diagram illustrating a third embodiment.
Figure 15:
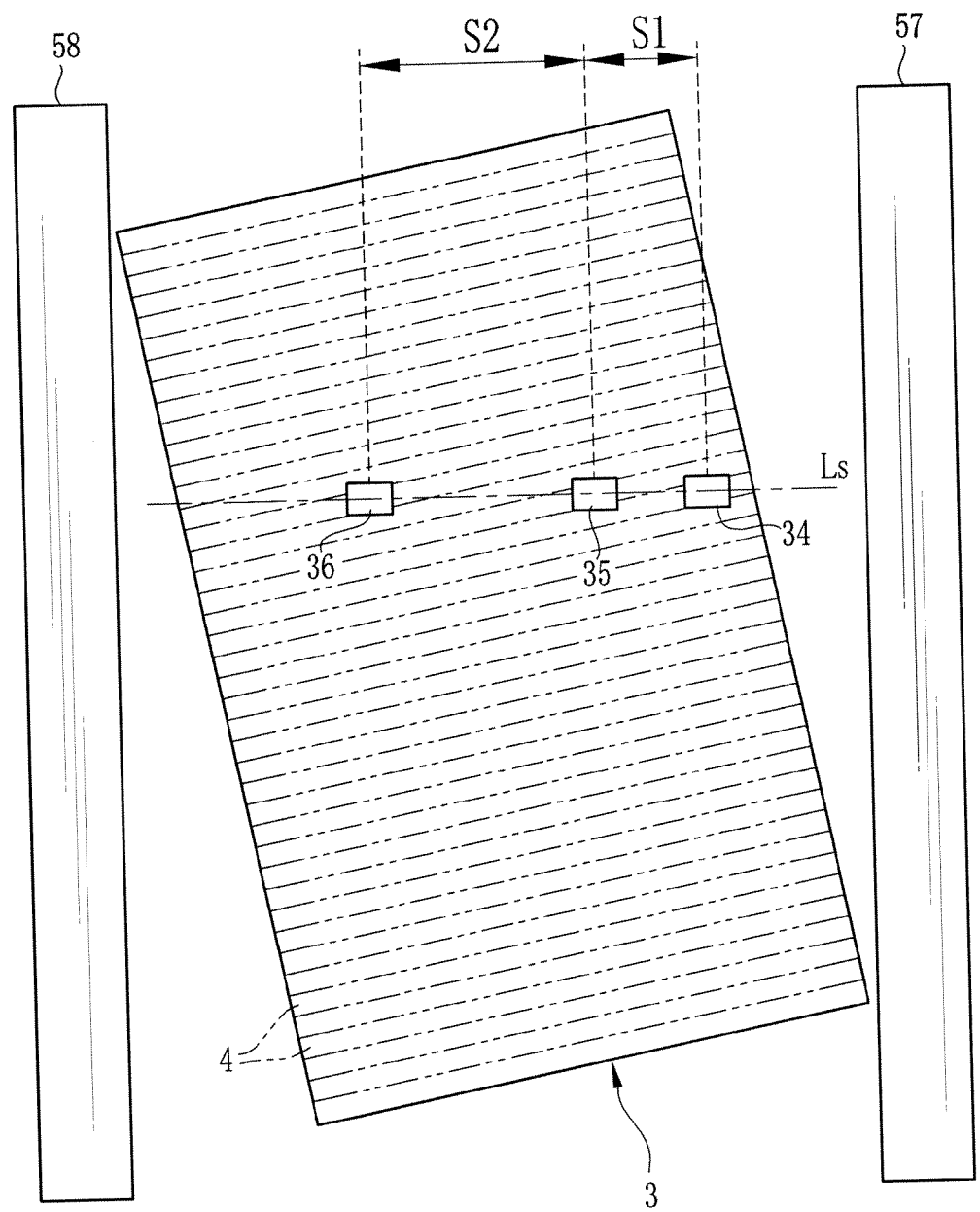
FIG. 15 is an explanatory diagram illustrating a comparative example to the third embodiment.

As shown in FIG. 14, the third embodiment is equivalent to the second embodiment in one aspect that respective distances S1 and S2 between the first to third lens sensors 34 to 36 are adjusted. However, unlike the second embodiment, the third embodiment makes use of left and right skew regulation guides 57 and 58 which are disposed on the downstream side of a thermal head 16.

The lenticular sheet 3 is regulated in its skew angle by the left and right skew regulation guides 57 and 58 so that the lenticular sheet 3 will not skew beyond a predetermined angle. Accordingly, in the third embodiment, the distances S1 and S2 are adjusted to satisfy the following formulas (3) and (4) respectively when the lenticular sheet 3 skewing at the above-mentioned predetermined maximum angle moves past the lens sensors 34 to 36. In these formulas, "M" is any natural number from "2" to "n", wherein "n" is the maximum number of lenses 4 that a straight line Ls extending between the respective lens sensors 34 to 36 may concurrently cut across. In the drawing, the lenses 4 being concurrently cut across by the straight line Ls are indicated by bold lines, and n=5.

$$S1 \neq (S1+S2)/M \quad (3)$$

$$S2 \neq (S1+S2)/M \quad (4)$$

In contrast, where the distances S1 and S2 are each set to be equal to $\{(S1+S2)/M\}$, as shown in FIG. 5, the peaks of the detection signals from the lens sensors 34 to 36 will definitely coincide with each other in certain rotational positions of the lenticular sheet 3 where the longitudinal direction of the lenses 4 is not parallel to the main scan direction though. In view of this, it will be understood that, if the distances S1 and S2 satisfy the formulas (3) and (4), the peaks of the detection signals from the lens sensors 34 to 36 will not coincide with each other unless the longitudinal direction of the lenses 4 is parallel to the main scan direction. Thus the third embodiment will achieve the same effect as the second embodiment. Note that the tilt correction in the third embodiment may be carried out in the same way as in the second embodiment.

Figure 16:
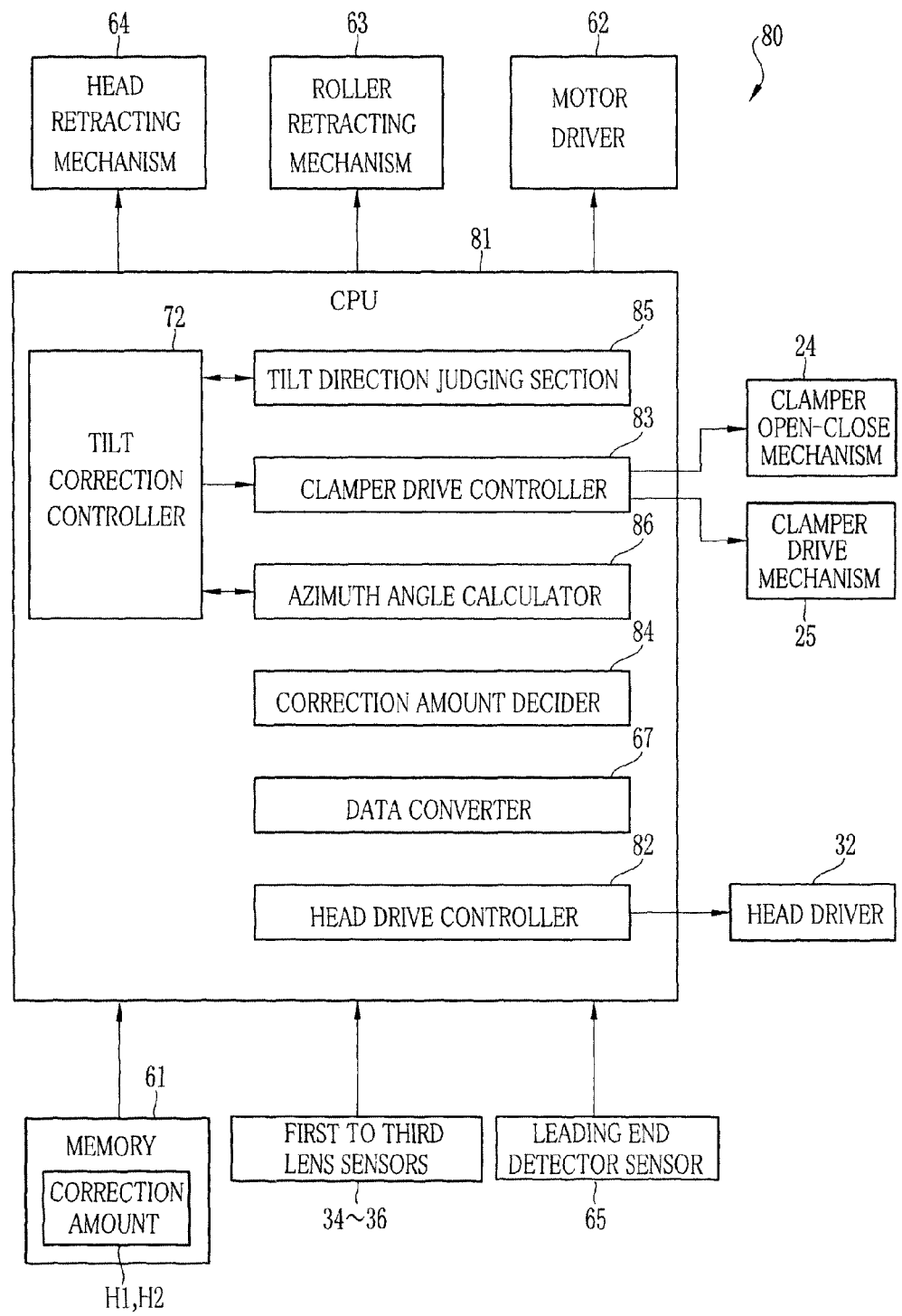
FIG. 16 is a block diagram illustrating the circuitry of a printer in accordance with a fourth embodiment, which performs tilt correction while taking account of misalignment of relative positions of individual lens sensors in the sub scan direction.

Next a printer 80 in the fourth embodiment of the present invention will be described with reference to FIG. 16. When the printer 80 is shipped from the factory or checked for maintenance, relative positions of respective lens sensors 34 to 36 to a thermal head 16 in the sub scan direction, hereinafter referred to simply as the relative positions, are detected to correct the tilt while taking account of misalignments between the detected relative positions.

The printer 80 may have the same configuration as the printer 2 of the above first embodiment, so that those being equivalent in function or structure to the components of the printer 2 are designated by the same reference numerals and the description thereof will be omitted. The printer 80, however, has a misalignment detection mode for detecting misalignments between the relative positions of the lens sensors 34 to 36 to the thermal head 16 in addition to a recording mode for recording an image on the sheet 3. Switching between these operational modes may be done by an operating section (not shown).

Moreover a CPU 81 of the printer 80 functions as a head drive controller 82, a clamper drive controller 83, a correction amount decider 84, a tilt direction judging section 85, and an azimuth angle calculator 86 besides a data converter 67 and a tilt correction controller 72 as described in the first embodiment.

The head drive controller 82 and the clamper drive controller 83 are equivalent to the head drive controller 68 and the clamper drive controller 69 of the first embodiment. The head drive controller 82 and the clamper drive controller 83 respectively control a head driver 32 and a clamper drive mechanism 25 in the misalignment detection mode, to record a test image 88 (see FIG. 18) elongated in the main scan direction on a test sheet and, thereafter, transport the test sheet toward the lens sensors 34 to 36. Note that the same sheet 3 as shown in FIG. 1 is served as the test sheet.

The correction amount decider 84 is actuated while the test sheet is being transported toward the lens sensors 34 to 36 after having the test image 88 recorded thereon. The correction amount decider 84 detects misalignments between the relative positions of the lens sensors 34 to 36 to the thermal head 16. Based on this detection result, the correction amount decider 84 decides correction amounts for correcting transport lengths LA, LB, L1 and L2, which are determined from the detection signals of the lens sensors 34 to 36, during the above described tilt correction.

The correction amounts determined by the correction amount decider 84 consists for example of a correction amount H1 and a correction amount H2, which respectively represent amounts of displacement of the second lens sensor 35 and the third lens sensor 36 relative to the first lens sensor 34. These correction amounts H1 and H2 are stored in a memory 61 or the like.

The tilt direction judging section 85 and the azimuth angle calculator 86 are equivalent to the tilt direction judging section 70 and the azimuth angle calculator 71 in the first embodiment. But the tilt direction judging section 85 and the azimuth angle calculator 86 correct the transport lengths LA, LB, L1 and L2 in the recording mode, which are determined from the detection signal of the lens sensors 34 to 36, on the basis of the correction amounts H1 and H2. This correction of LA and L1 is done for instance by adding the correction amount H1 to each of the transport lengths LA and L1 if the second lens sensor 35 shifts to the upstream side (the side closer to the thermal head 16) relative to the first lens sensor 34. On the other hand, on correcting LB and L2, if for instance the third lens sensor 36 shifts to the downstream side (the side away from the thermal head 16) relative to the first lens sensor 34, the correction amount H2 is subtracted from each of the transport lengths LB and L2. Based on these corrected transport lengths, the tilt direction of the lenses 4 and the azimuth angles for rough and fine adjustment are determined.

Figure 17:
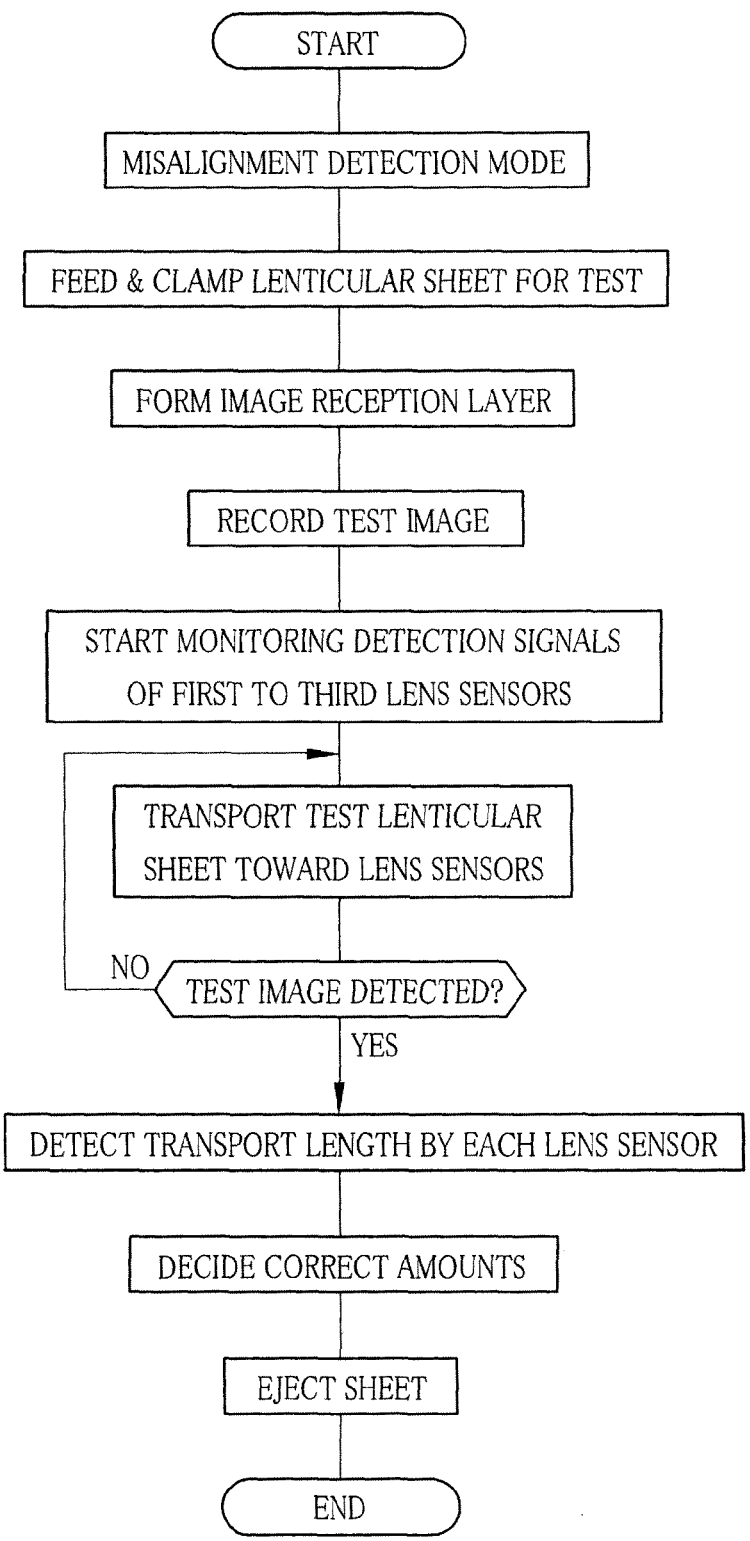
FIG. 17 is a flowchart illustrating a process of deciding correction amounts.

Now a process of deciding the correction amounts H1 and H2 in the misalignment detection mode will be described with reference to the flowchart of FIG. 17. When the printer 80 is inspected for shipment from the marker or undergone the maintenance for replacing some parts such as the thermal head 16 or the lens sensors 34 to 36, the operational mode of the printer 80 is switched to the misalignment detection mode.

After the switching to the misalignment detection mode, the test sheet is fed from a feed-in slot 11 into a transport track 12 and is clamped by the clamper 23 to be transported toward the downstream while an image reception layer is formed on the reverse surface of the test sheet, just as described in the above first embodiment. After the image reception layer is formed, the test sheet is transported toward the upstream till a leading end of the recording area goes past the thermal head 16.

Next a CPU 60 actuates a film changing mechanism 30 to set an ink film 28 underneath the thermal head 16 and thereafter controls the head retracting mechanism 64 to move the thermal head 16 to the pressing position. In this stage, any color of ink area may be put on the reverse surface of the test sheet.

After the thermal head 16 is pressed on, the clamper drive controller 69 controls the clamper drive mechanism 25 to transport the test sheet to the downstream side. After the test sheet starts being transported, the head driver controller 68 controls the head driver 32 at appropriate timings to cause two rows of heating element array 16a of the thermal head 16 to generate heat energy for heating the ink film 28. Thereby two lines of stripe images elongated in the main scan direction are recorded on the image reception layer.

Figure 18:
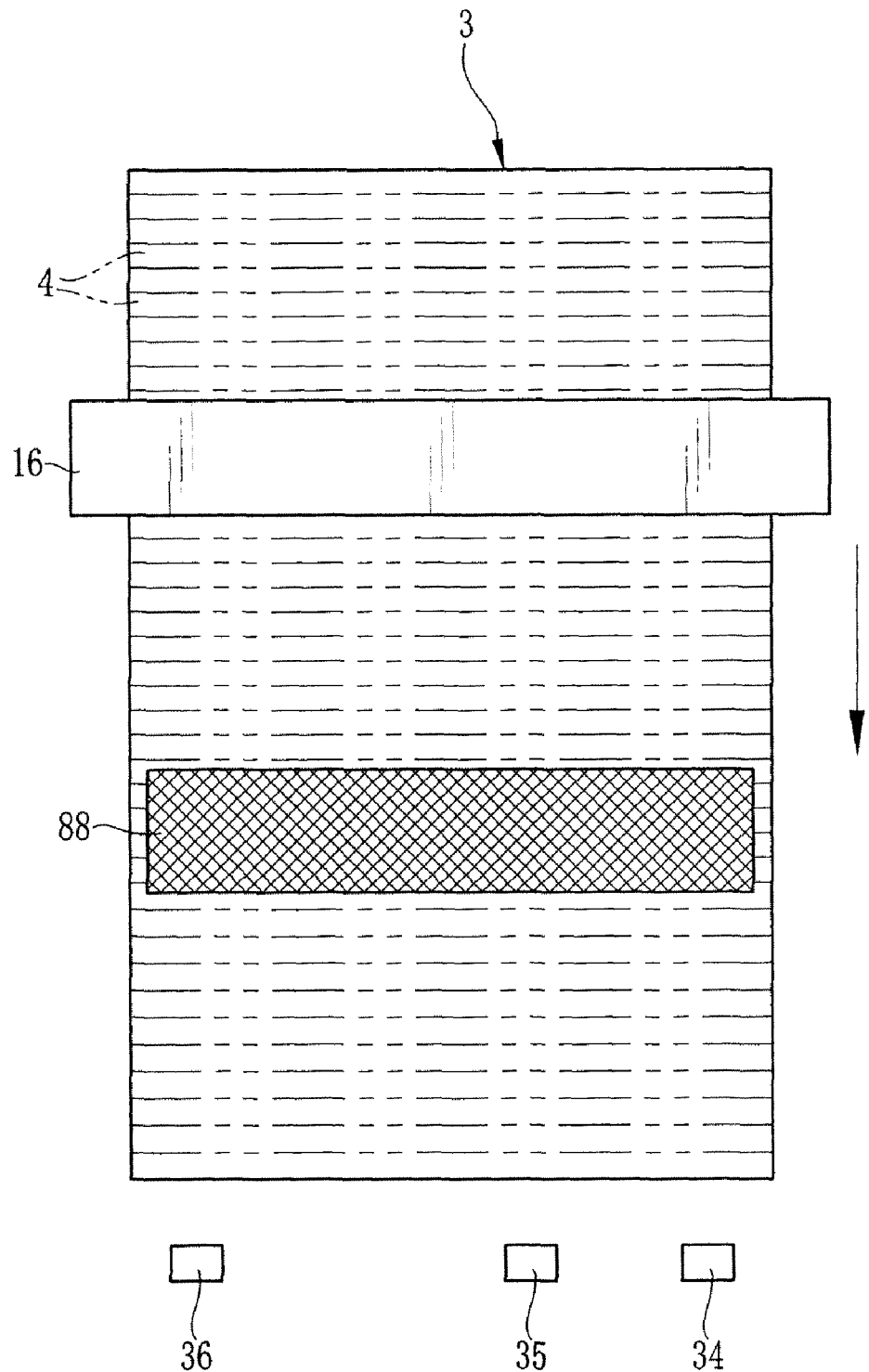
FIG. 18 is an explanatory diagram illustrating recording of a text image for deciding correction amounts.

Thereafter, the transport of the test sheet toward the downstream by a distance corresponding to two line (P/6) and the recording of two lines of stripe images are alternately repeated a predetermined number of times, recording a test image 88 in an appropriate area on the reverse surface of the test sheet, as shown in FIG. 18. The test image 88 has an edge that is elongated in the main scan direction and parallel to the main scan direction regardless of the skew or tilt of the test sheet or lenses 4. Therefore, the main scan direction can be determined with reference to the edge of the test image 88.

After the recording of the test image 88, the clamper drive controller 69 controls the clamper drive mechanism 25 to carry the clamper 23 to the downstream. Thereby the test sheet is transported to the lens sensors 34 to 36.

Figure 19:
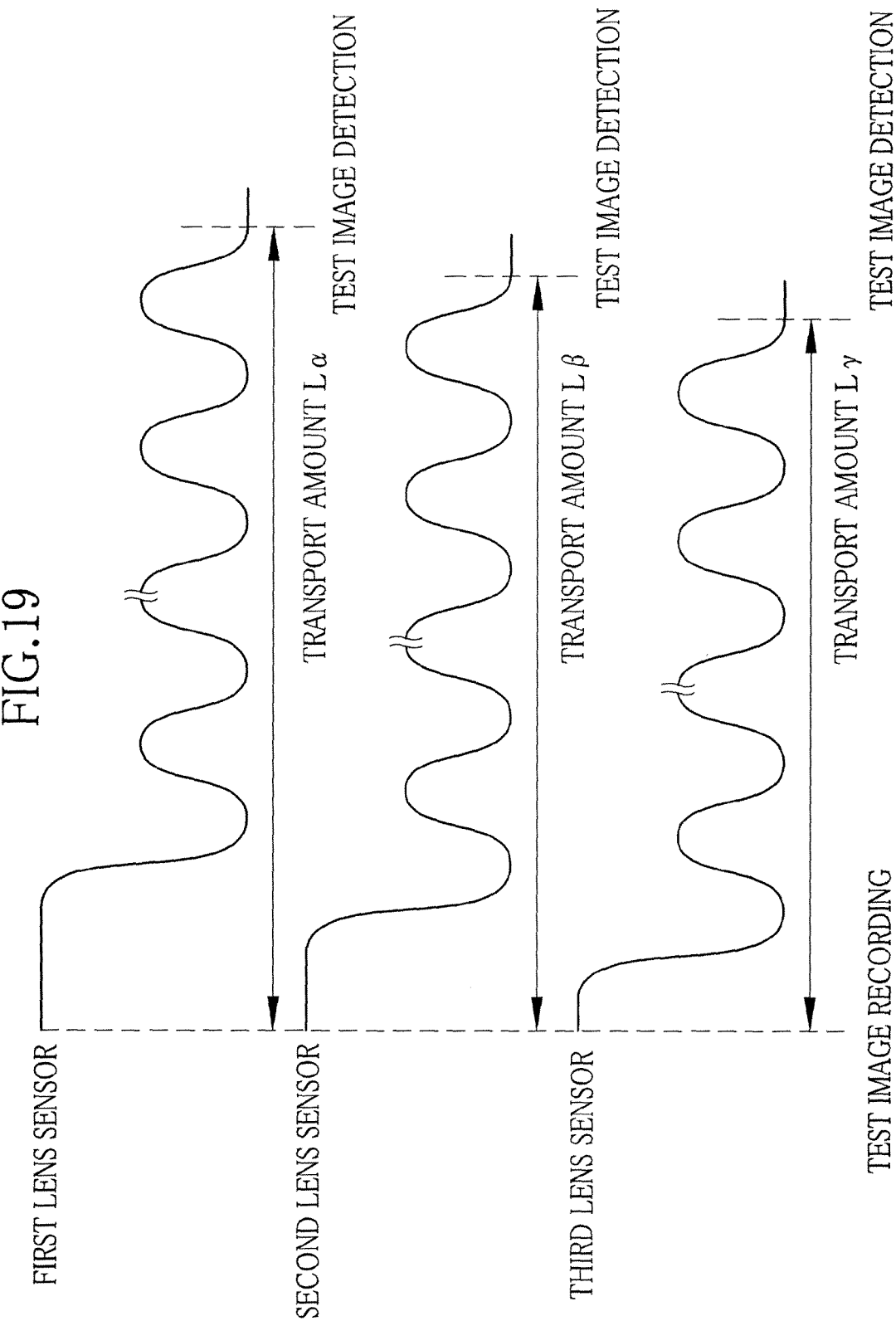
FIG. 19 is an explanatory diagram illustrating a process of detecting the misalignment of the relative positions of the respective lens sensors.

On the other hand, as shown in FIG. 19, as the recording of the test image 88 starts, the correction amount decider 84 starts monitoring the detection signals from the lens sensors 34 to 36. Until the lenses 4 on the test sheet reach the position at the lens sensors 34 to 36, the detection signals output from the lens sensors 34 to 36 are at the maximum level. Thereafter when the lenses 4 move past the location of the lens sensors 34 to 36, the detection signals of the lens sensors 34 to 36 vary according to concavities and convexities of the lenses 4. When the test image 88 on the test sheet reaches the location of the lens sensors 34 to 36, the detection signals output from the lens sensors 34 to 36 get to the minimum.

On the basis of the respective detection signals of the lens sensors 34 to 36, the correction amount decider 84 determines transport lengths L$\alpha$, L$\beta$ and L$\gamma$ of the test sheet in a period from the start of recording the test image 88 to the detection of this test image 88 by the individual lens sensors 34 to 36. Since the edge of the test image 88 is parallel to the main scan direction, the transport lengths L$\alpha$, L$\beta$ and L$\gamma$ will be equal to each other if the relative positions of the lens sensors 34 to 36 to the thermal head 16 are in alignment with each other. On the contrary, if the relative positions of the lens sensors 34 to 36 shift from each other, the transport lengths L$\alpha$, L$\beta$ and L$\gamma$ will differ from each other in magnitude.

Thus the correction amount decider 84 can detect the misalignment between the relative positions of the lens sensors 34 to 36 by comparing the magnitudes of the transport lengths L$\alpha$, L$\beta$, and L$\gamma$ with each other. Then the correction amount decider 84 calculates a difference between the transport lengths L$\alpha$ and L$\beta$, and a difference between the transport lengths L$\alpha$ and L$\gamma$, to decide the correction amounts H1 and H2 respectively. The correction amounts H1 and H2 are memorized in a memory 61 for use in real printing.

In a case where lens sensors 34 to 36 are disposed for example on the upstream side of the thermal head 16, the test sheet is transported once to the upstream side and thereafter to the downstream side. In that case, the transport lengths L$\alpha$, L$\beta$ and L$\gamma$ are those from the restart of transporting the test sheet to the downstream side till the test image 88 is respectively detected by the lens sensors 34 to 36.

After the correction amounts H1 and H2 are memorized, the test sheet is ejected from the feed-out slot in the same way as in the first embodiment. Thus the process of detecting the correction amounts H1 and H2 is finished.

Figure 20:
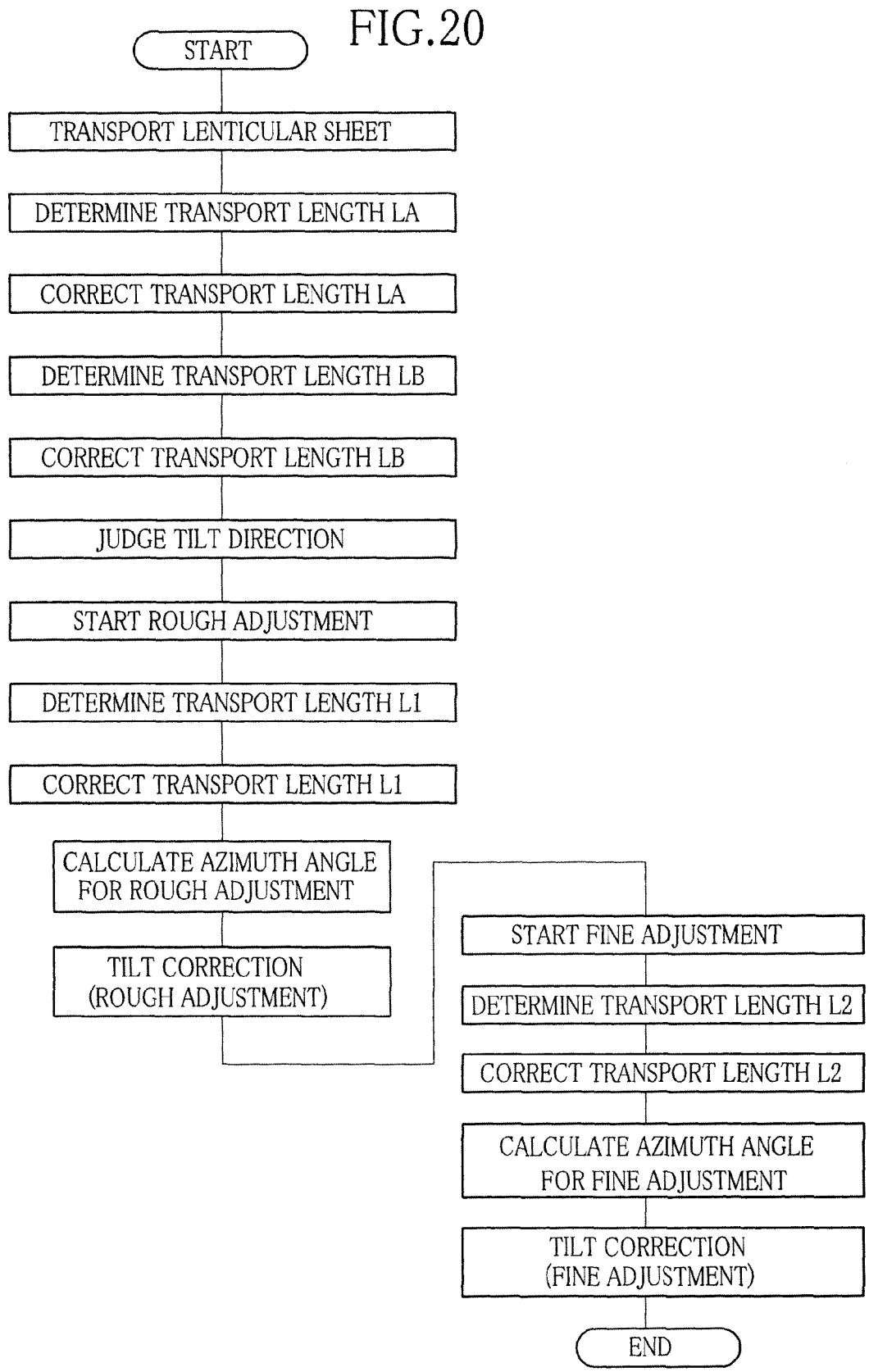
FIG. 20 is a flowchart illustrating the tilt correction process for the lenticular lenses in the fourth embodiment.

Next a tilt correction using the correction amounts H1 and H2 will be described with reference to FIG. 20. At the start of the tilt correction in the actual printing, the sheet 3 is transported toward the downstream and the tilt direction judging section 85 is actuated concurrently.

The tilt direction judging section 85 determines, as shown in FIG. 8, a transport length LA from a peak of the detection signal corresponding to the first lens sensor 34 to a following peak of the detection signal corresponding to the second lens sensor 35. Then the tilt direction judging section 85 correct the transport length LA on the basis of the correction amount H1 in the memory 61.

After correcting the transport length LA, the tilt direction judging section 85 determines an estimated value of a transport length LB until the third lens sensor 36 detects a border 4a that has previously been detected by the first lens sensor 36, on the basis of the corrected transport length LA and a distance S1 between the first and second lens sensors 34 and 35, using the above formulas (1) and (2). Then the tilt direction judging section 85 corrects the transport length LB on the basis of the correction amount H2 in the memory 61.

Thereafter the judgment on the tilt direction of the lenses 4 is done in the same way as in the first embodiment, and the result of judgment is input to the tilt correction controller 72. With the corrected transport lengths LA and LB, the tilt direction may be determined on the assumption that the relative positions of the lens sensors 34 to 36 are in alignment with each other.

After the judgment on the tilt direction, the azimuth angle calculator 86 is actuated to start calculating an azimuth angle for rough adjustment. As shown in FIG. 11(A), the azimuth angle calculator 86 determines the magnitude of a transport length L1 from a reference point corresponding to a peak of the detection signal of the first lens sensor 34 to the nearest peak of the detection signal of the second lens sensor 35 to the reference point. Then the transport length L1 is corrected on the basis of the correction amount H1 in the memory 61. Then the azimuth angle calculator 86 calculates the azimuth angle for rough adjustment on the basis of the corrected transport length L1 in the same way as in the above first embodiment.

Thereafter, in the same way as in the above first embodiment, the tilt of the longitudinal direction of the lenses 4 relative to the main scan direction is roughly adjusted by turning the clamper 23 so as to reduce the azimuth angle for rough adjustment to zero. After the completion of this rough adjustment, the sheet 3 is transported toward the downstream. Then the azimuth angle calculator 86 starts calculating an azimuth angle for fine adjustment.

As shown in FIG. 11 (B), the azimuth angle calculator 86 calculates the magnitude of a transport length L2 from a reference point corresponding to a peak of the detection signal to the first lens sensor 34 to the nearest peak of the detection signal of the third lens sensor 36 to the reference point. Next this transport length L2 is corrected on the basis of the correction amount H2 in the memory 61. Then the azimuth angle calculator 86 calculates the azimuth angle for fine adjustment on the basis of the corrected transport length L2 in the same way as in the above first embodiment.

Like in the above first embodiment, the tilt of the longitudinal direction of the lenses 4 relative to the main scan direction is finely adjusted by turning the clamper 23 so as to reduce the azimuth angle for fine adjustment to zero. After this fine adjustment, stripe images are recorded on the reverse surface of the sheet 3 on the basis of a plurality of viewpoint images in the manner as set forth above.

Correcting the transport lengths L1 and L2 on the basis of the respective correction amounts H1 and H2 makes it possible to determine the azimuth angles for rough and fine adjustments on the assumption that the relative positions of the lens sensors 34 to 36 are in alignment with each other. Thus the accuracy in positioning the lens sensors 34 to 36 can be comparatively rough. As a result, the cost of manufacture for the printer 80 may be reduced. Since the relationship in relative position between the lens sensors 34 to 36 and the heating element array 16a is recognizable, the stripe images can be recorded in designated positions.

Next the fifth embodiment of the present invention will be described. In the above first embodiment, the lens pitch P0 is determined after the tilt correction of the lenses 4. However, the lens pitch P0 may for example be calculated at the same time when the azimuth angle for rough adjustment or the azimuth angle for fine adjustment is determined.

For example, providing that θ1 represents an azimuth angle for rough adjustment or the azimuth angle for fine adjustment, and P1 represents a transport length from an arbitrary peak of any one of the lens sensors 34 to 36 to the next peak, the lens pitch P0 can be calculated using the formula (5). Thus the lens pitch P0 may be determined before executing the tilt correction:

$$P0 = P1 \times \cos\theta \quad (5)$$

In the above embodiments, the azimuth angle detector 18 consists of the first to third lens sensors 34 to 36 which are aligned in the main scan direction, but the number of lens sensors may be more than three. Also in this case, the spacing between the lens sensors should be adjusted so as not to space every lens sensor at a constant interval.

Although the above embodiments carryout the tilt correction of the lenses 4 after forming the image reception layer, the timing of carrying out the tilt correction (attitude correction) is not particularly limited, but it is possible to carry out the tilt correction before forming the image reception layer. Although the above embodiments execute the tilt correction of the lenses 4 by turning the clamper 23 with the clamper drive mechanism 25 as shown in FIG. 5, other attitude adjusting mechanisms may be used instead.

Although two lines of heating element array are disposed adjacent to each other in the above embodiment, it is possible to provide an appropriate gap between the two lines of the heating element array for the purpose of eliminating thermal influence between the heating element array lines. Moreover, it is possible to form an image reception layer, multiple kinds of ink layers and a backing layer sequentially on a single film.

The configurations, procedures and other features as described in the above embodiments may be combined appropriately insofar as it is consistent. Although the description of the above embodiments relates to line printers, the present invention is applicable to serial printers. Moreover the application field is not limited to the recording of viewpoint images for recording a stereoscopic image, but the present invention is usable for recording a so-called changing image in which visible images will change with a shift in the view position. Furthermore, the present invention is applicable not only to sublimate-type thermal printers but also to heat transfer type thermal printers, inkjet printers and others.

What is claimed is:

1. A printer for recording on a lenticular sheet having a plurality of lenticular lenses formed on an obverse surface, said lenses extending in a main scan direction, said printer comprising:

a transport section for transporting said lenticular sheet along a transport track extending in a sub scan direction perpendicular to the main scan direction;

a recording section for subdividing multiple viewpoint images into stripe images parallel to the main scan direction and recording said stripe images on a reverse surface of said lenticular sheet;

at least first to third detecting sensors disposed in said transport track and aligned in the main scan direction, to output detection signals corresponding to concavities and convexities of said lenticular lenses, at least one of three distances existing between said first to third detecting sensors being different from other two;

an attitude adjusting section for adjusting attitude of said lenticular sheet on said transport track; and a control section for determining, prior to the recording by said recording section, direction and angle of tilt of the longitudinal direction of said lenticular lenses relative to the main scan direction on the basis of the detection signals of said first to third detecting sensors, and controlling said attitude adjusting section on the basis of the tilt direction and angle to align the longitudinal direction of said lenticular lenses to be substantially parallel to the main scan direction, wherein the tilt direction is determined from the detection signals of said first to third detecting sensors, whereas the tilt angle is determined from the detection signals of two of said detecting sensors, and wherein said attitude adjusting section roughly adjusts the attitude of said lenticular sheet based on a first tilt direction and a first tilt angle, which are determined first, and determines a second tilt direction and a second tilt angle after this rough adjustment, to execute a fine adjustment on the basis of these second tilt direction and second tilt angle, wherein the first tilt angle is determined from detection signals of those two of said detecting sensors which are spaced at a narrower distance, and the second tilt angle is determined from detection signals of those two of said detecting sensors which are spaced at a wider distance.

2. The printer as recited in claim 1, wherein a regulation guide for regulating the attitude of said lenticular sheet is provided in said transport track, to regulate the attitude of said lenticular sheet on said transport track so that a transport length of said lenticular sheet in a period from when either one of the two detecting sensors used for the rough adjustment detects any of said lenticular lenses till when the other detects this lenticular lens may be smaller than a lens pitch of said lenticular lenses.

3. The printer as recited in claim 1, wherein the distance between the two detecting sensors used for the rough adjustment is so determined that a transport length of said lenticular sheet in a period from when either one of these two detecting sensors detects any of said lenticular lenses till when the other detects this lenticular lens may be smaller than a lens pitch of said lenticular lenses.

4. The printer as recited in claim 1, wherein the distance between said first detecting sensor and said second detecting sensor and the distance between said second detecting sensor and said third detecting sensor are in the relation of prime numbers that they have no common divisor except "1".

5. The printer as recited in claim 1, wherein said transport track is provided with a regulation guide for regulating skew angle of said lenticular sheet to be within a predetermined angle, and when it is provided that "n" represents a maximum number of those lenticular lenses which a straight line connecting said detecting sensors may concurrently cut across over said lenticular sheet when said lenticular sheet skews maximally, that S1 represents a magnitude of the distance between said first detecting sensor and said second detecting sensor, that S2 represents a magnitude of the distance between said second detecting sensor and said third detecting sensor, and that "M" represents any natural number from "2" to "n", said S1 and S2 satisfy the following formulae:

$$S1 \neq \{(S1+S2)/M\}$$

$$S2 \neq \{(S1+S2)/M\}$$

6. The printer as recited in claim 1, further comprising:
a recording controller for driving said recording section to record a test image elongated in the main scan direction on said lenticular sheet;
a transport controller for controlling said transport section such that said lenticular sheet after having said test image recorded thereon will pass through said first to third detecting sensors; and
a shift amount detector for detecting shift amounts of relative positions of said detecting sensors in the sub scan direction by comparing the detection signals of said detecting sensors after said test image is recorded till said test image moves past said detecting sensors, wherein
said control section determines the tilt angle and the tilt direction from the detection signals of said detecting sensors on the basis of a result of detection by said shift amount detector, assuming that the relative positions of said detecting sensors are in alignment with each other.

7. The printer as recited in claim 1, wherein said control section decides the lens pitch of said lenticular lenses on the basis of a transport length of said lenticular sheet in a cycle of the detection signals and the previously determined tilt angle.

8. The printer as recited in claim 1, wherein said attitude adjusting section comprises a clamper for clamping a leading end of said lenticular sheet and a turning mechanism for turning said clamper above a transport surface of said transport track.

9. The printer as recited in claim 1, wherein said first to third detecting sensors have light-emitting elements for projecting light toward said lenticular sheet and light-receiving elements for receiving light projected from said light-emitting element, said light-emitting elements being opposed to said light-receiving elements across said transport track.

* * * * *